Inventor:
Herman A. Imhof

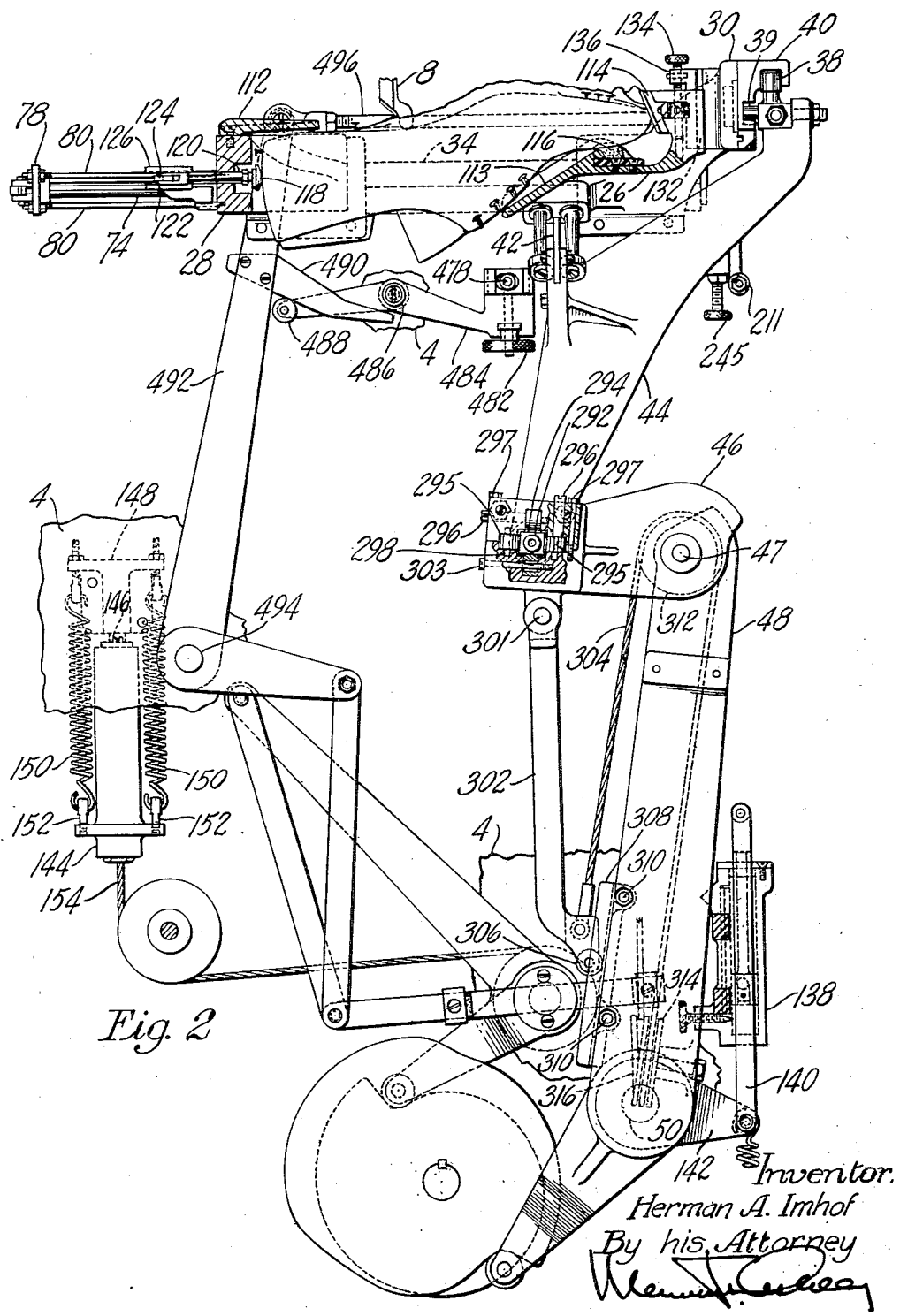

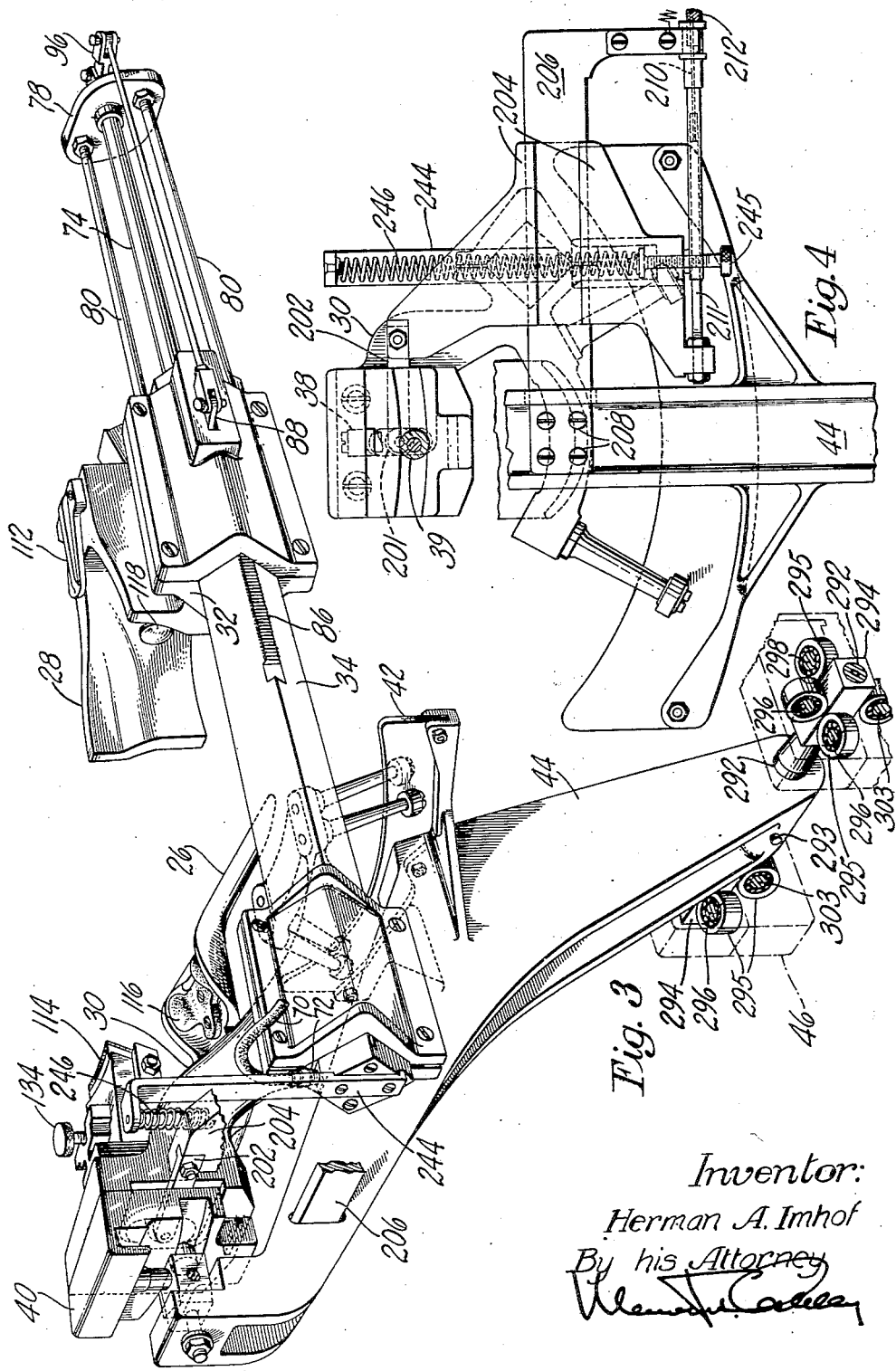

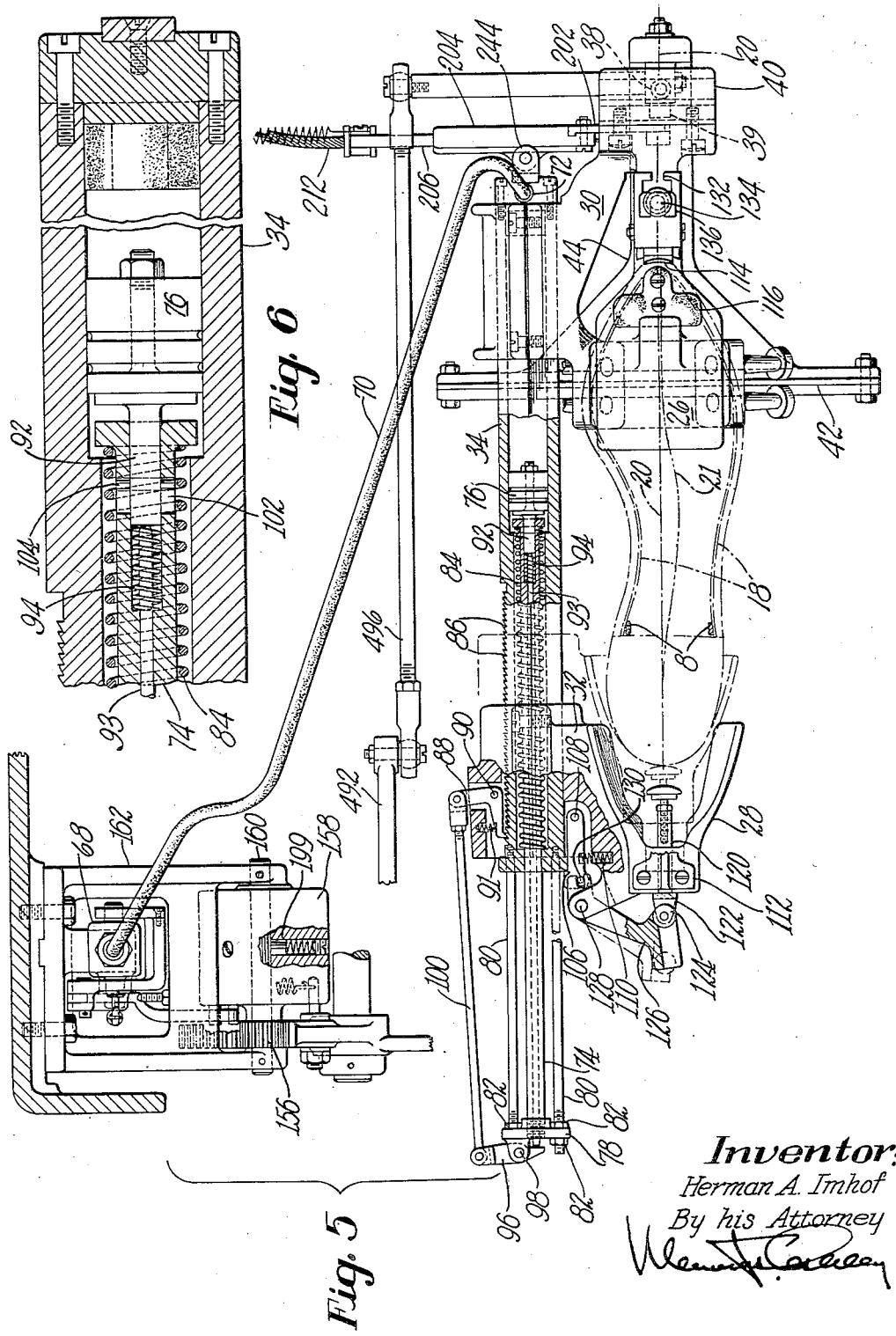

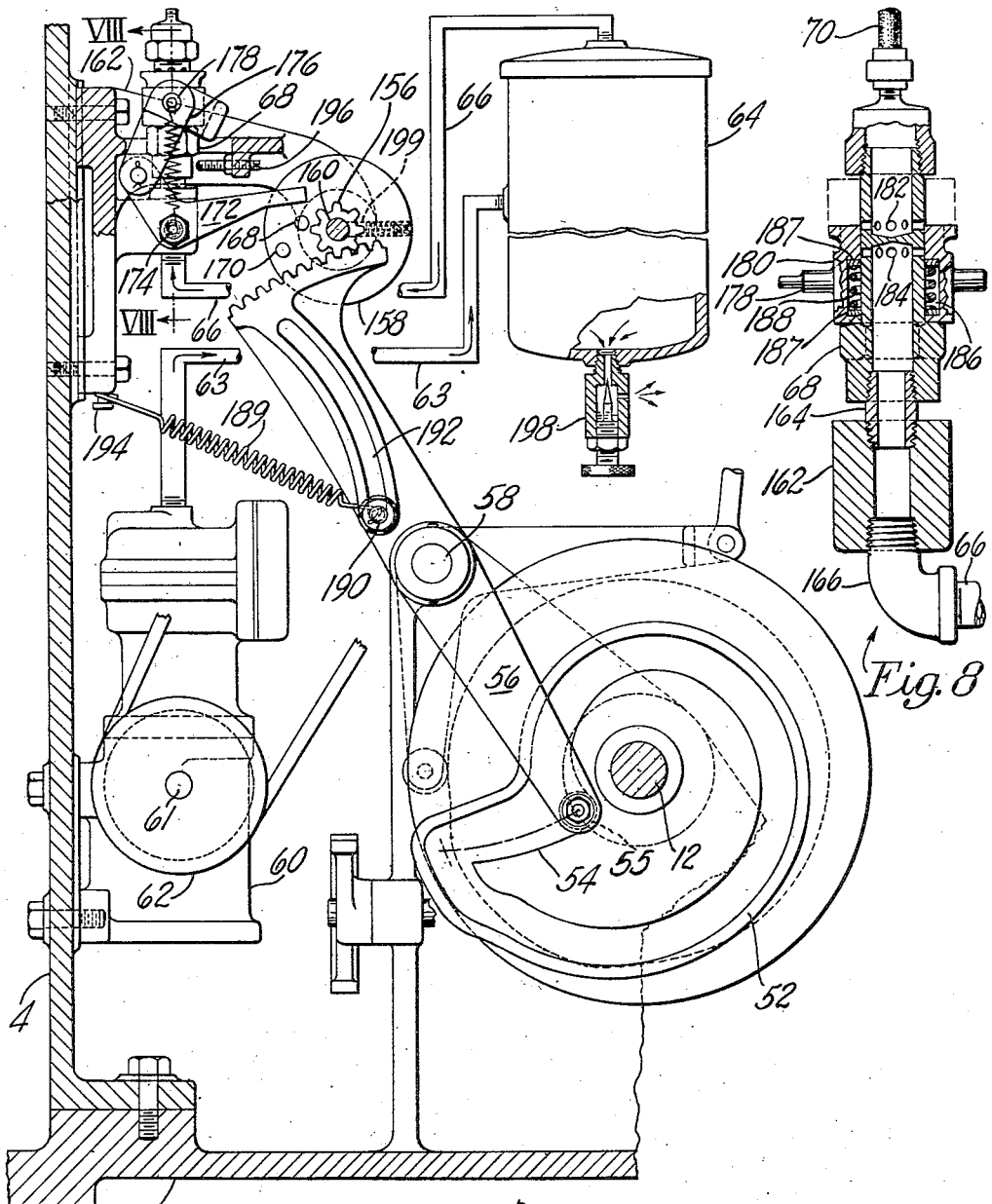

Inventor:
Herman A. Imhof
By his Attorney

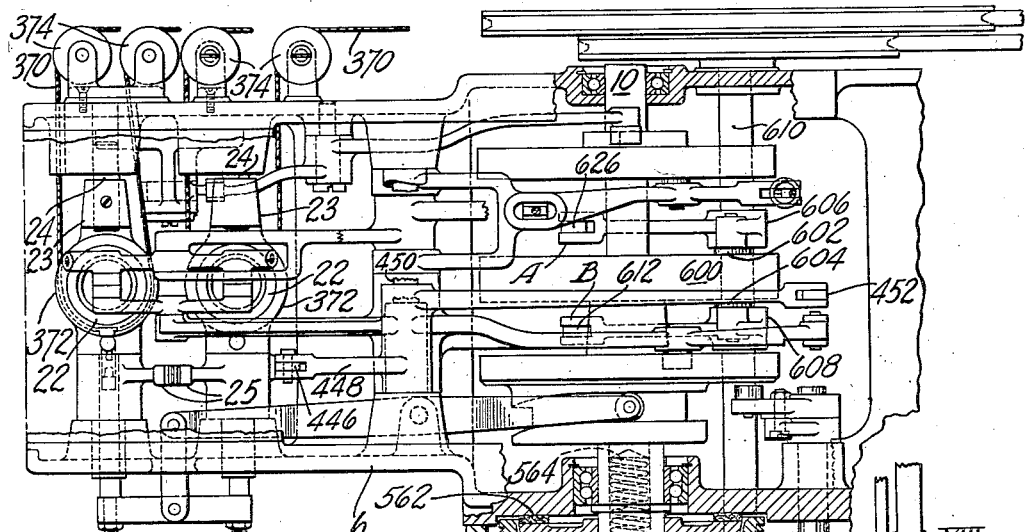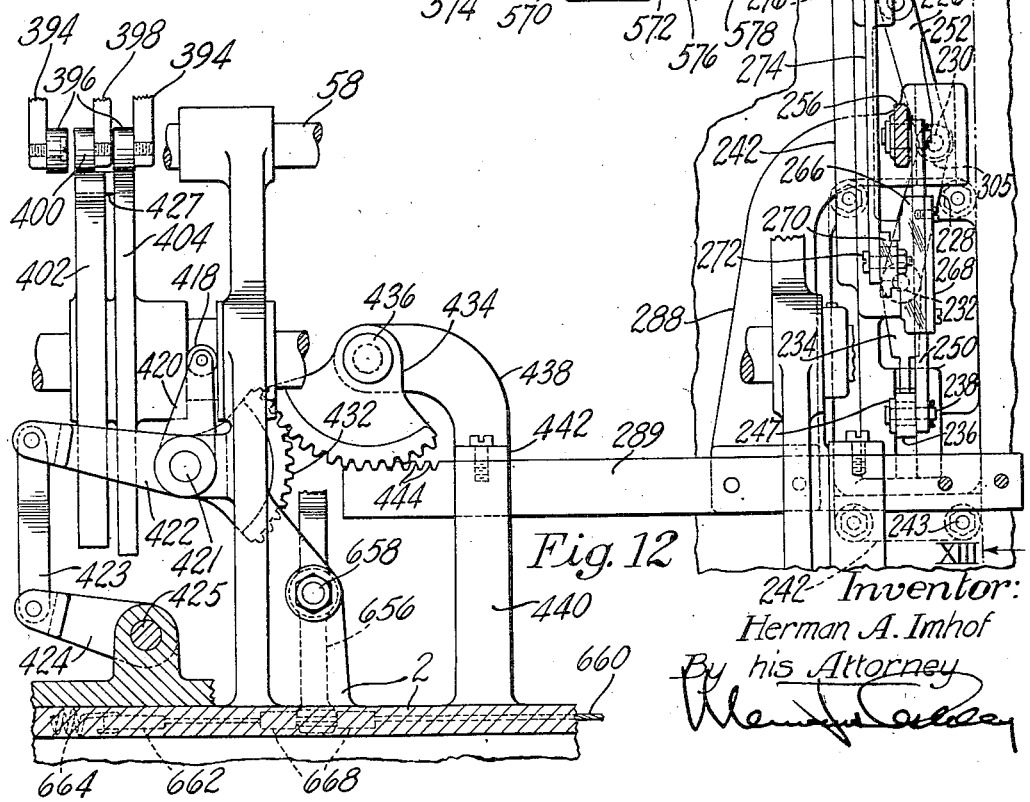

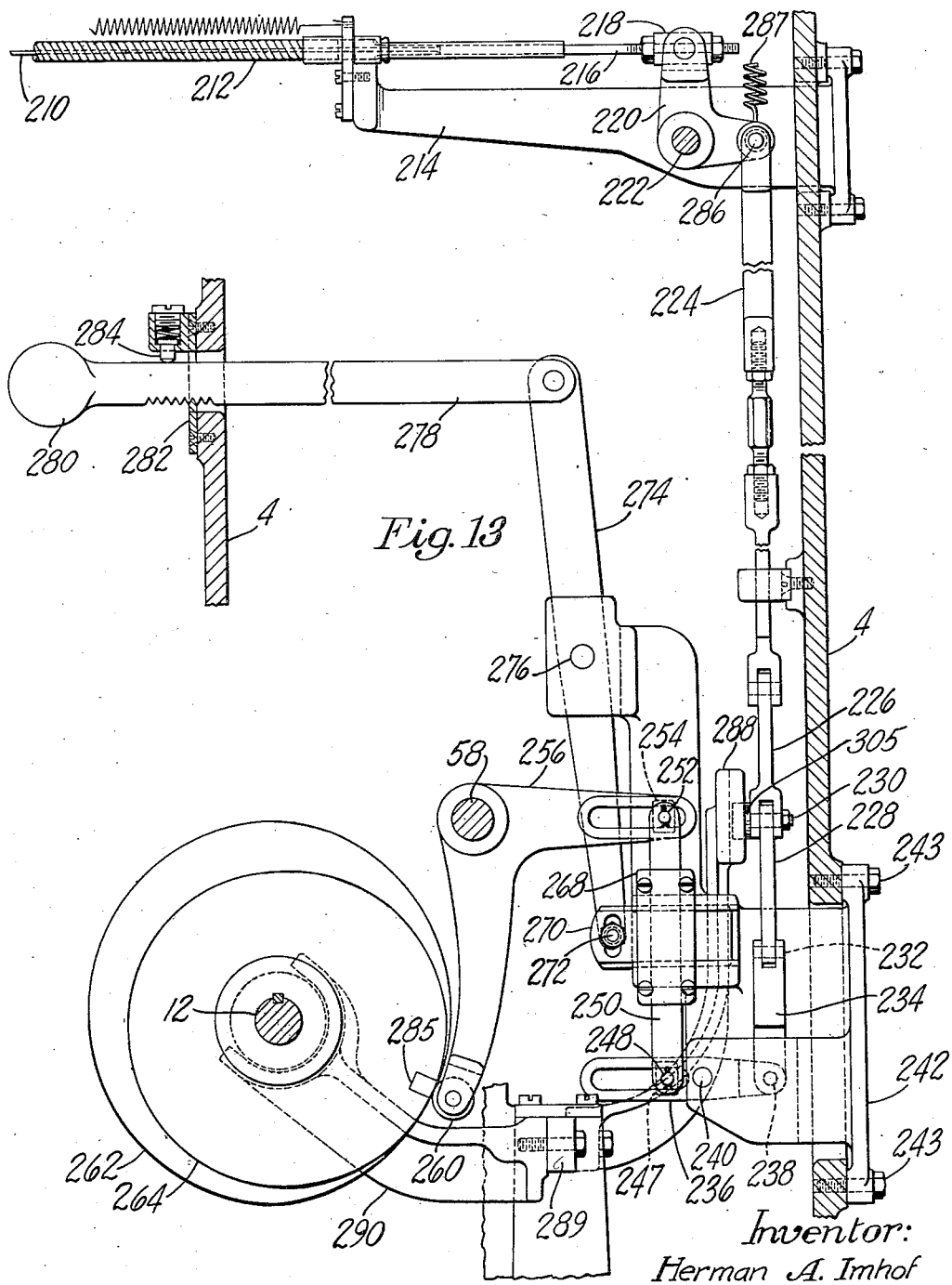

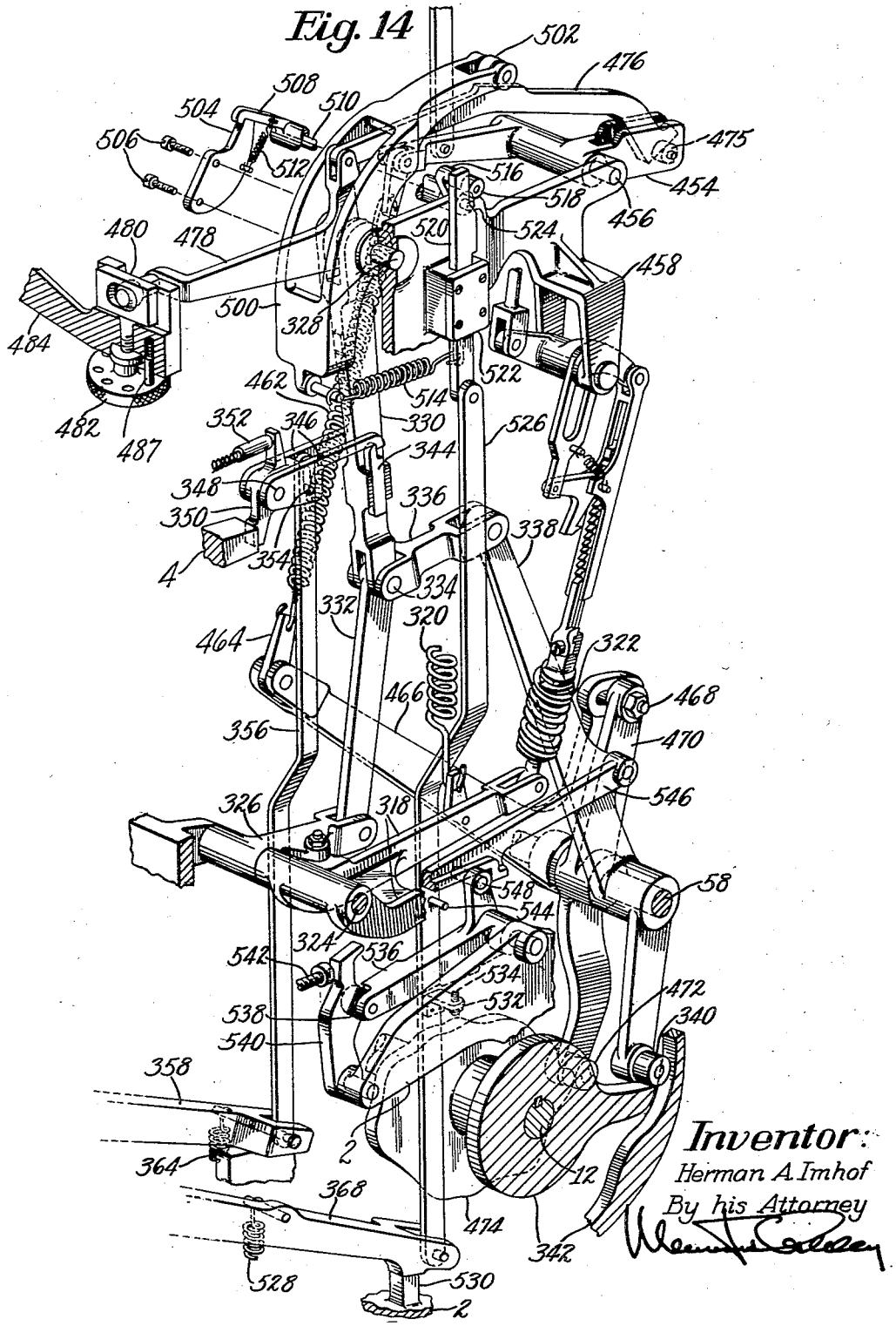

*Inventor:*
Herman A. Imhof
By his Attorney

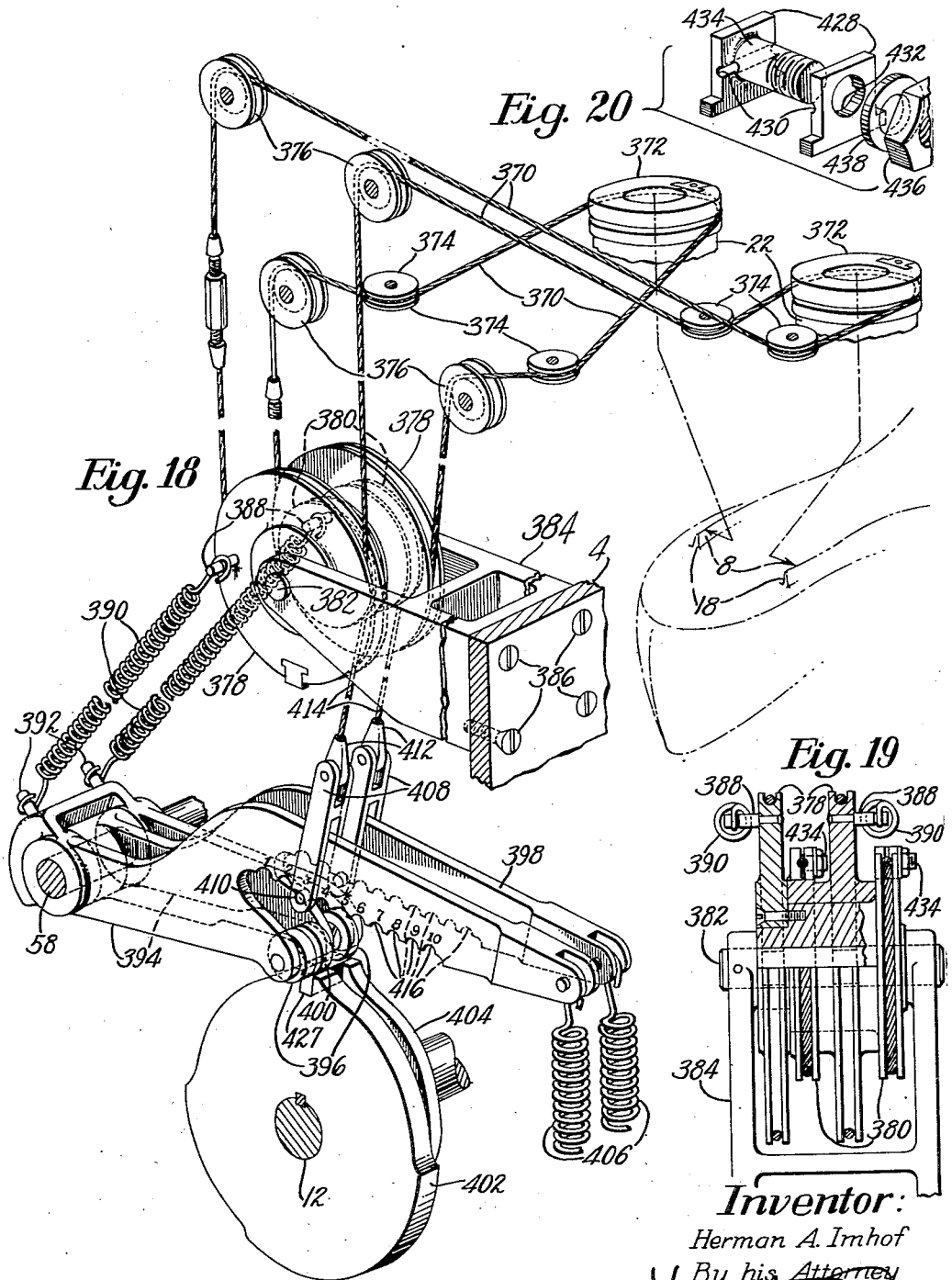

United States Patent Office 2,799,874
Patented July 23, 1957

2,799,874

MACHINES FOR USE IN THE MANUFACTURE OF SHOES

Herman A. Imhof, Hamilton, Mass., assignor to United Shoe Machinery Corporation, Flemington, N. J., a corporation of New Jersey Application January 11, 1955, Serial No. 481,184

40 Claims. (Cl. 12—10.3)

The present invention relates to automatic machines for use in the manufacture of shoes and is herein illustrated as embodied in an automatic side lasting machine of the type in which operating devices act simultaneously along opposite marginal portions of the shoe in the manner disclosed in United States Letters Patent No. 2,201,866, granted May 21, 1940, upon application of Robert H. Lawson, and No. 2,660,739, granted December 1, 1953, upon application of the present inventor. Certain features of the invention are adapted for use in automatic machines other than lasting machines in which the operating devices act simultaneously along opposite marginal portions of a shoe, or in lasting machines which are not fully automatic in the positioning movements imparted to a shoe during its presentation to the operating devices.

The objects of the present invention are to simplify and improve the construction and mode of operation in a machine of the type disclosed in the patents above identified. Other objects are to provide an automatic side lasting machine which will operate on a shoe more smoothly and with greater accuracy and reliability than heretofore. A further object is to reduce the mass of a jack employed to support a shoe during lasting operations so that the inertia of the jack will have a minimum effect on the feeding and positioning movements imparted thereto.

One feature of the invention in pursuance of its objects comprises the elimination of a cam mounted directly on the jack supporting structure for actuating a shoe clamping and unclamping mechanism and the substitution of connections with a cam on the pattern cam shaft in the machine frame acting through a flexible casing extending to the jack. To reduce still further the inertia of the parts in the jack structure during movements of a shoe in certain directions the supporting structure of the jack disclosed in the prior patents is provided with an additional sliding joint so that it is unnecessary to move all of the parts. Further features relate to improvements in a jack depressing and raising mechanism for retaining the jack against the action of a raising spring in a depressed position where a new shoe may be applied and for releasing a newly jacked shoe from a depressed position into a raised position engaging the lasting devices, to improved lasting unit turning adjustable connections and to other features, as hereinafter described and claimed, the constructions and modes of operation of which will readily be apparent from the following detailed description, taken in connection with the accompanying drawings, in which:

Fig. 2 is a view in front elevation, partly in section and on an enlarged scale of a shoe supporting jack and cradle together with its associated structure in the machine of Fig. 1;

Fig. 3 is a perspective view on a further enlarged scale of the jack frame and cradle shown in Fig. 2 looking from the right side and rear thereof;

Fig. 4 is a view in right side elevation, partly broken away of the shoe supporting cradle and its mounting in the jack frame;

Fig. 5 is a plan view on a somewhat reduced scale and partly in section of the shoe supporting jack and cradle showing its shoe clamping and unclamping mechanism;

Fig. 6 is a sectional detail view on an enlarged scale of a shoe clamping and unclamping cylinder employed in the jack;

Fig. 7 is a sectional detail view on a reduced scale of the controlling mechanism for releasing a shoe from a clamp on the jack;

Fig. 8 is a sectional detail view on an enlarged scale taken along the line VIII—VIII of Fig. 7 of a valve employed in the shoe clamp controlling mechanism;

Fig. 11 is a plan view broken away and in section of the operating head in the machine, illustrating the driving and stopping mechanism;

Fig. 12 is a sectional view of a mechanism for shifting the turning movements imparted to the lasting units for right and left shoes and for adjusting the extent of turning movements;

Fig. 13 is a sectional detail view of the unit turning movement adjusting mechanism taken along the line XIII—XIII of Fig. 12;

Fig. 14 is a perspective view partly in section and partly in separated relation of some of the actuating and controlling connections for the machine;

Fig. 18 is a perspective view of the lasting unit turning mechanism;

Fig. 19 is a quarter-sectioned detail view of cable actuating pulleys employed in the lasting unit turning mechanism; and, Fig. 20 is a detail perspective view on an enlarged scale of a cable end clamp for securing the cable to the guide actuating pulleys.

Figure 1:
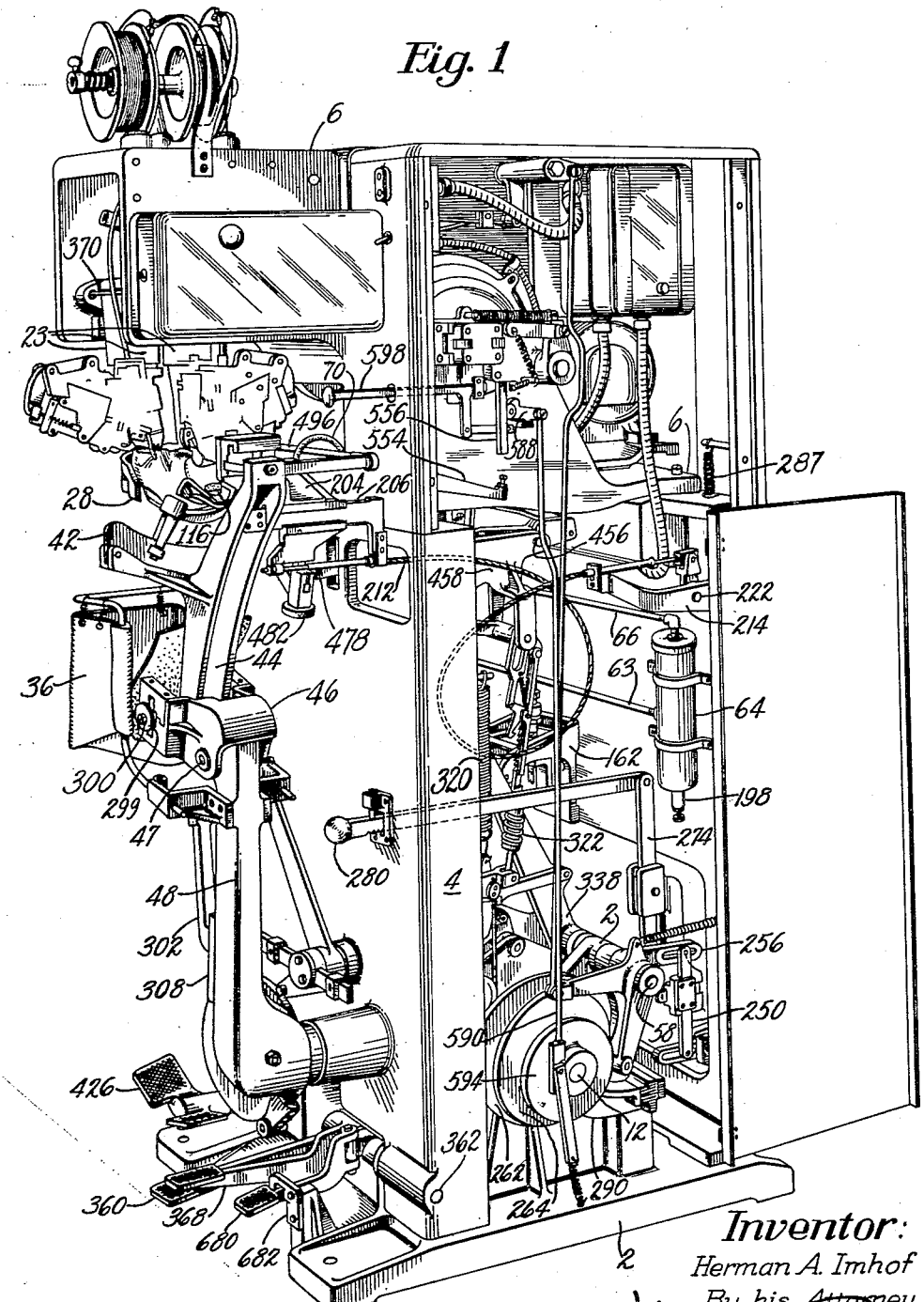
Fig. 1 is a perspective view looking from the right front of an automatic shoe side lasting machine embodying the features of the present invention.

The machine illustrated in the drawings is an automatic shoe side lasting machine having a main frame comprising a machine base 2 on which is mounted a rectangular hollow frame 4 supporting at its upper end a head 6 provided at its front side with two sets of lasting units comprising upper tensioning and fastening devices pivotally mounted in the frame of the head 6 for swinging movement toward and from each other and rotatably mounted about axes substantially perpendicular to the bottom of a shoe being operated upon. The lasting units are arranged to act simultaneously and progressively along opposite marginal portions of a ribbed insole in the shoe and the fastening devices act to insert wire staples as the lasting devices operate. The lasting units are provided with rib engaging abutments 8 (see Figs. 16 and 18) and are the same in construction and mode of operation as those disclosed in Patent No. 2,660,739. The machine also has a jack provided with shoe supporting and clamping means which is moved bodily step by step to feed the shoe during lasting operations and to present successive portions of the shoe upper successively to the tensioning and fastening devices.

Figure 16:
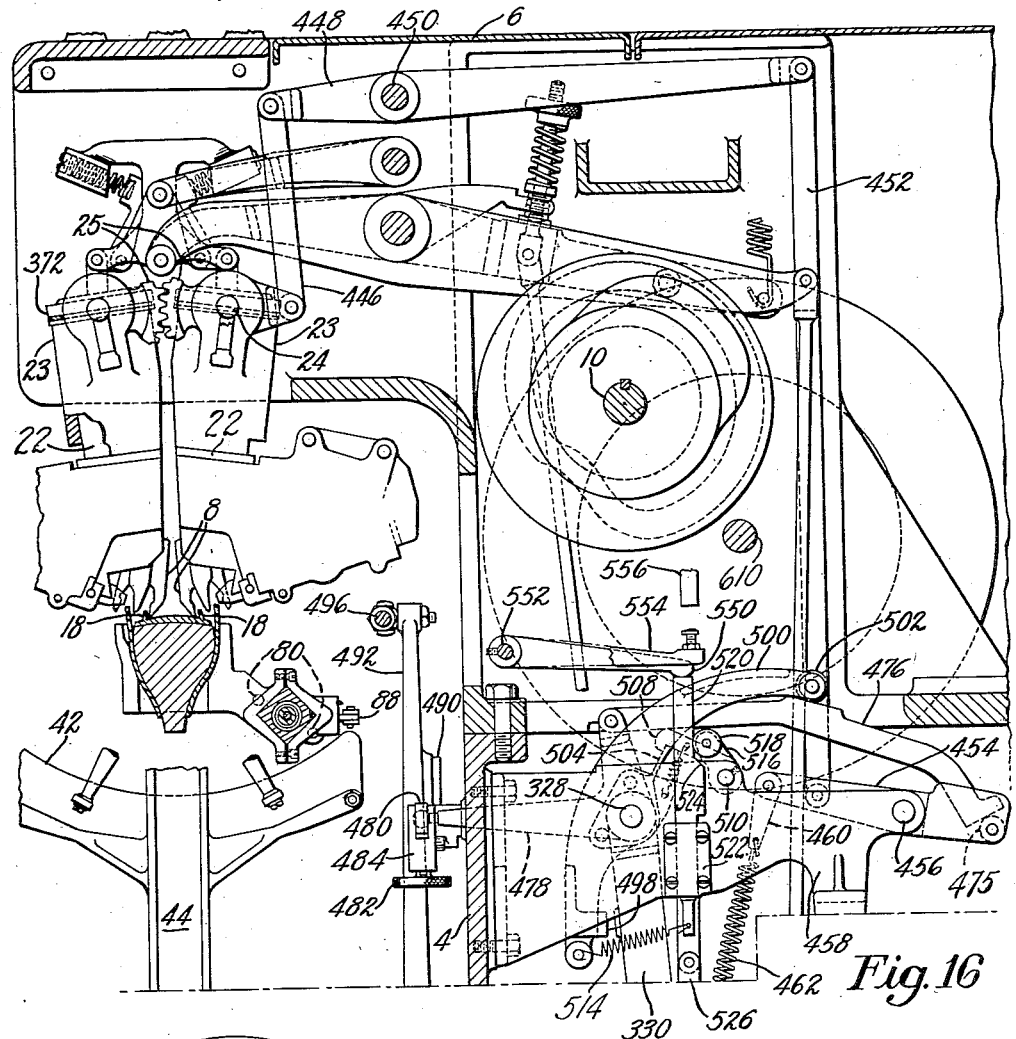
Fig. 16 is a similar view of the upper portion of the machine including the lasting units and their driving mechanisms.

For actuating the upper tensioning and fastening devices the illustrated machine is provided with a hollow ended operating cam shaft 10, best shown in Figs. 11 and 16. The cam shaft is mounted in the head 6 and is connected to mechanisms for actuating the jack including main and auxiliary shafts 12 and 14 rotatably mounted in bearings projecting from the base 2 of the frame (see Fig. 9) at right angles to each other and provided with a number of pattern cams. The pattern cam shafts are connected through bevel gears 16 to cause them to be rotated in unison. To enable the operating shaft 10 and the cam shafts 12 and 14 to be driven in proper timed relation to each other the operating shaft is connected, as hereinafter described, through step-by-step mechanism to the pattern cam shaft 12. For rotating the operating shaft a driving and stopping mechanism is employed similar to that disclosed in United States Letters Patent No. 2,423,852, granted July 15, 1947, upon application of Charles A. Robinson and the present inventor.

The machines of the patents above referred to are arranged to cause a shoe upper and ribs of the insole to be presented to the lasting units, in part by the pattern cam actuated mechanisms above referred to, and in part by yielding engagement of the rib engaging abutments 8 with the bottom surface of the insole. For this purpose the abutments comprise channel engaging presser feet or staple clenching anvils yieldingly pressed against the inner sides of opposite sewing ribs on the insole, indicated at 18 (see Figs. 5 and 16), as the shoe is fed by the pattern cam mechanism. The lasting units are connected for simultaneous equal motions in opposite directions so that they move toward and from a central plane perpendicular to the shoe bottom and defined by an axis 20 of a pivot mounting (Fig. 5) arranged lengthwise of a shoe on a supporting cradle mounted directly below the lasting units. Upward pressure of the insole on the shoe against the abutments causes the shoe to roll about the axis 20 as the shoe is fed and a yielding force applied to the supports causes them to ride against the sewing ribs as the width of the insole varies along its length, in a manner more fully described in the prior patents. Running along the shoe equidistant from the sewing ribs is a center line, indicated at 21, for the insole, which center line is curved. To enable the pressures of the abutments on the shoe insole to be balanced within close limits at all times about the axis 20 of the pivotal mounting, the shoe and cradle are shifted laterally of the lengthwise axis of the pivotal mounting and relatively to the pivotal mounting to cause the pivot axis 20 to intersect the curved center line progressively during the operation of the machine. To move the abutments 8 toward and from the pivot axis 20, they are carried by supports 22 (see Figs. 11 and 16) rotatable in cylindrical bearings 23 fixed to separate spaced pins 24 rotatable in the head 6, the bearings 23 being provided with mutually meshing gear segments 25.

The machine of Patent No. 2,660,739 is constructed and arranged to impart effective feeding and positioning movements to shoes of the greatest possible range in size and style but leaves something to be desired in the way of accuracy of shoe positioning control at high speed operation, the patented machine being primarily intended for universal operation upon all types and styles of shoes including those of extreme lengthwise curvature, such as the so-called "Ground Gripper" type. In constructing the patented machine for universal operation on all types and styles of shoes, considerable mechanism has been employed which is unnecessary for use with a large percentage of shoes customarily manufactured. For these reasons the machine of Patent No. 2,660,739 is handicapped from excessive mass of the parts in its jack supporting structure, and from its complicated construction and expensive upkeep. Accordingly, the machine of the present invention is constructed more particularly on the basis of a simplified form more nearly of the type disclosed in Patent No. 2,201,866 while still embodying many features of construction disclosed in Patent No. 2,660,739 with further improvements to overcome difficulties encountered in connection with manufacture, use and upkeep of that machine.

To obviate certain difficulties commonly found with all automatic shoe side lasting machines of the prior art, the illustrated machine is equipped with a shoe supporting jack having its mass greatly reduced by removing all of the operating mechanisms and most of the connections thereto which heretofore have been mounted on the jack or its supporting structure, so that a close accuracy in positioning movements may be obtained in presenting a shoe to the lasting units at speeds higher than previously considered possible without resistance met as a result of inertia.

Referring to Fig. 2, the illustrated jack with its pivotally mounted cradle is a simplified form of the type disclosed in United States Letters Patent No. 2,489,416, granted November 29, 1949, upon application of the present inventor. The cradle has shoe clamping means including a toe rest 26, a heel clamp 28, offset supporting arms 30 and 32 (see Fig. 5) and a connecting bar having a non-circular outer surface in the form of a cylinder 34 of squared cross-section, the arms and bar constituting the shoe supporting cradle. The pivotal mounting for the cradle on the jack frame enables rocking movement of a clamped shoe about the lengthwise pivot axis 20 of the cradle mounting. The toe rest arm 30 is secured to the cylinder 34 and the heel clamp arm 32 is slidable thereon toward and from the toe rest, the square outer section of the cylinder bar serving to hold the arms against rotation about the cylinder bar. The mounting for the cradle is arranged to admit unobstructed downward passage of a shoe at one side of the cylinder bar under the action of gravity from a position between the toe rest and heel clamp so that the only duty imposed on the operator is to apply a new shoe to the toe rest and heel clamp before each new lasting operation is started, each lasted shoe thereafter dropping from a clamped position into a receptacle 36, shown in Fig. 1.

The shoe supporting cradle including the arms 30 and 32 and the cylinder 34 is maintained in position by cantilever action in fulcrum bearings including rolls 38 and 39 (Fig. 2) projecting into slots of a guideway block 40 secured to the offset arm 30 at the toe end of the cradle and a vertical arcuate guideway plate 42 secured to a flange projecting upwardly from a jack frame 44 actuated by the pattern cam shafts and mounted for movement on the main frame of the machine. The jack frame supporting structure comprises a horizontally extending channelled link 46 pivotally connected at one end to the lower end of the jack frame and at the other end by a pin 47 to a vertical arm 48 extending upwardly from a base, described more fully hereinafter, to which base is secured a horizontal pivot 50 (see Fig. 2), the axis of which extends transversely to the length of a shoe on the jack and forms a rotatable mounting for the base on the main frame 4 of the machine. The axes of the pivots connecting the link 46 to the jack frame and to the arm 48 also are parallel to the horizontal axis about which the base swings. To secure and release a shoe the shoe supporting cradle in prior machines is provided with shoe clamping and unclamping means actuated by a cam rotatably mounted directly on the jack frame.

In accordance with the present invention a cam mounted on one of the pattern cam shafts in the main frame is utilized in place of the one on the jack frame and the clamping means includes a light weight flexible operative connection provided by an air pressure confining casing connected at one end to the main frame and at the other end to the jack cradle. Conveniently, the flexible casing comprises a part of a pneumatic system for exerting pressure on the shoe clamping means, in which the effects of inertia are extremely small and with which is employed structure already existent in the jack, encumberances of the jack frame or cradle in the form of heavy cams and their actuating econnections being eliminated. In this way the mass of the jack and its frame are substantially reduced.

Figure 9:
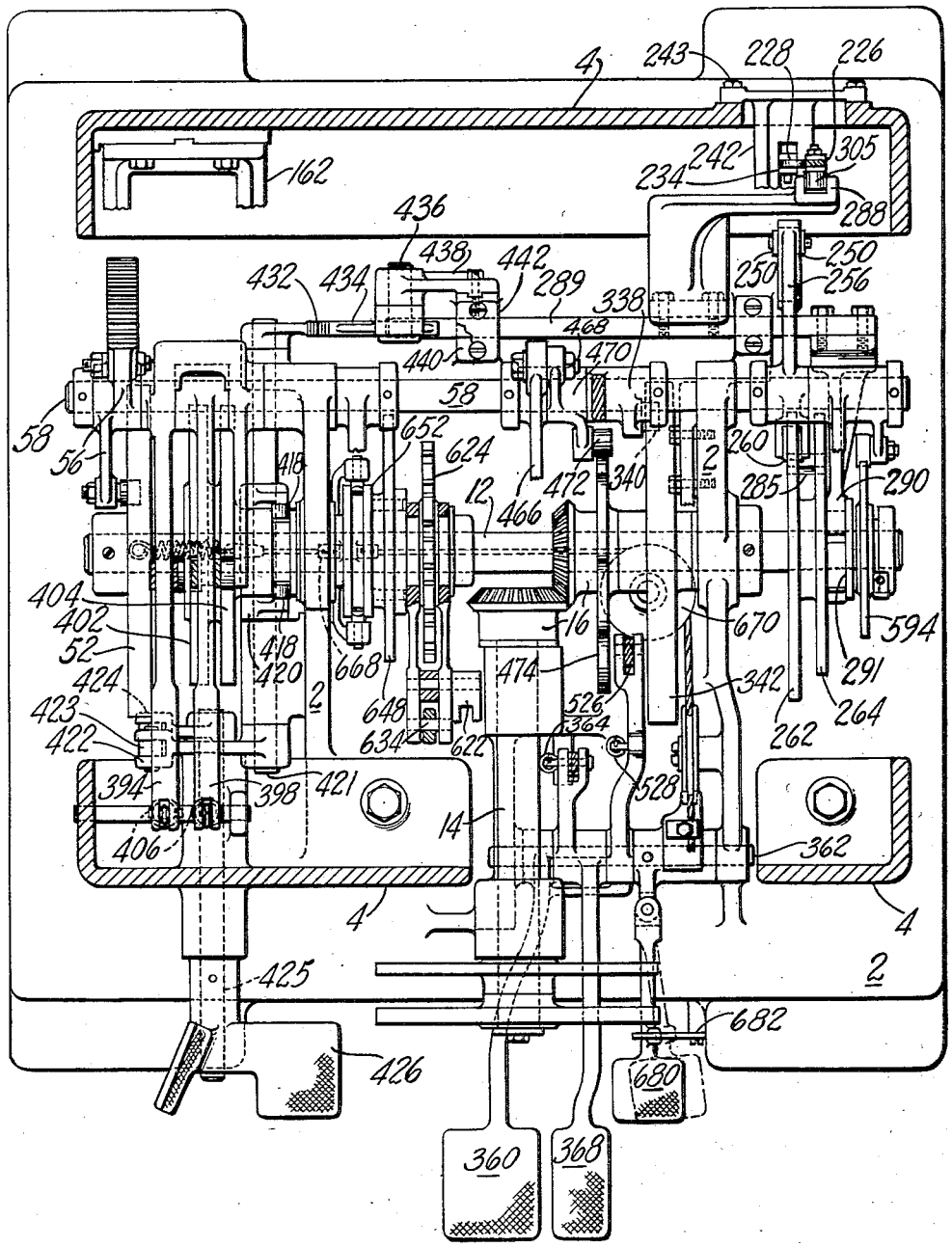
Fig. 9 is a sectional plan view on a reduced scale of the base of the machine including a pattern cam driving mechanism.

The cam for actuating the shoe clamping and unclamping means is mounted at the left end of the pattern cam shaft 12 and is best shown in Figs. 7 and 9 at 52. This cam has a snail groove with an abrupt drop connecting its largest and smallest radii. With the exception of the abrupt drop portion, indicated at 54, the cam 52 has a groove of uniform width and the groove is engaged by a follower 55 (Fig. 7) at the lower end of a cam lever 56 fulcrumed on a horizontal shaft 58 secured in upwardly projecting flanges on the base 2 just above and at the rear of the pattern cam shaft 12. The cam lever 56 serves to control the pneumatic system. Along the abrupt drop portion 54 the groove in the cam 52 is wider than along the uniform width portion in order that the cam roll on the lever 56 will not lock the cam against rotation while it is traveling from the largest to the smallest radii.

The pneumatic system comprises a source of compressed air including a continuously driven pump 60 secured inside the rear wall of the main frame 4. The pump has an operating shaft 61 driven by a continuously rotating pulley 62 secured thereto. Connected with an outlet to the pump by a tube 63 is a reservoir 64 and a tube 66 connected to the upper end of the reservoir 64 leads to a pressure venting control valve 68 actuated by the cam lever 56.

The flexible casing, indicated at 70 in Fig. 5, is connected at one end to the control valve 68 and at the other end to the inside of the cylinder 34 on the shoe supporting cradle. For connecting the flexible casing to the cylinder a fixture 72 enters it at its right end which has clamped to it the toe supporting arm of the cradle and from the other end of the cylinder toward and from which the heel clamp arm slides there projects a rod 74 connected through a lost-motion connection inside the cylinder with a piston 76 slidingly mounted within a circular bore in the heel clamp end of the cylinder. The end of the piston rod 74 outside the cylinder is connected to the heel clamp arm 32 through a crosshead 78 secured to the piston rod and to threaded extremities of a pair of parallel connecting rods 80, one at either side of the piston rod. The connecting rods carry clamp nuts 82 engaging opposite sides of the crosshead. The rods 80 are also threaded at their ends opposite the crosshead and are engaged in threaded openings at the outer end of the heel clamp arm 32. Thus, the only structural parts moving with the heel clamp arm along the cylinder bar of the cradle are the rods 80, crosshead 78, piston rod 74 and the piston 76. These parts are of relatively small mass as compared with the weight of the heel clamp and its arm 32 so that the heel clamp is capable of quick movement toward and from the toe rest in clamping and unclamping a shoe. The arrangement of the parts is such that air is admitted to the cylinder 34 only while a shoe is being unclamped. During operation of the machine the heel clamp is locked against separation from the toe rest and the heel clamp before being locked is actuated toward the toe rest to clamp a shoe by a compression spring 84 surrounding the piston rod 74 within the cylinder 34. One end of the spring 84 rests against a shoulder inside the left end of the cylinder 34 and the other end of the spring is connected to the piston by resting against an enlargement at the right end of the piston rod 74, the spring being compressed by the piston when the clamped shoe is to be released.

To lock the heel clamp in shoe clamping position and from separation from the toe rest one corner of the cylinder is flattened and provided with a series of ratchet teeth 86 facing toward the toe rest end of the cylinder. Mounted for movement toward and from the ratchet teeth is a pawl 88 in the form of a lever fulcrumed on a pin 90 passing across a slot in that portion of the heel clamp arm 32 which surrounds the cylinder. The pawl 88 is forced yieldingly against the ratchet teeth by a coil spring 91 compressed between the pawl and an indentation within the slot of the heel clamp arm. In clamping a shoe the heel clamp arm 32 slides along the cylinder bar toward the toe rest arm 30, the pawl 88 sliding along the tops of the teeth 86 until the heel clamp arm comes to rest.

To unlock the heel clamp from the pawl 88 and to release a shoe from the cradle the piston 76 has secured to it one end of a stud 92 (see Fig. 6) slidingly mounted at its other end within a bore communicating with a passage running the entire length of the piston rod 74. The stud 92 is engaged with one end of a spring 94 compressed between it and an internal shoulder within the piston rod. Running through the bore of the piston rod is a pin 93 operatively connected to the piston at one end through the stud 92 and slidingly mounted in the piston rod. The pin 93 projects beyond the left end of the piston rod, and is operatively connected by engagement with one arm of a rock lever 96 fulcrummed on a pin 98 carried by lugs projecting from the crosshead 78. The other arm of the rock lever 96 is pivotally connected to a link 100 also pivotally connected to an arm of the pawl 88 which projects from the slot at the rearward side of the heel clamp arm 32. To limit the relative sliding movement of the piston 76 and the rod 74, the piston end of the rod is formed with a lengthwise diametrical slot 102 (see Fig. 6) and the stud 92 carries a cross pin 104, the ends of which project into the slot 102. Whenever compressed air is admitted to the cylinder 34 it first forces the piston 76 against the spring 94 and moves the piston relatively to the rod 74. In so doing the lever 96 and link 100 actuate the pawl 88 out of engagement with the teeth 86. After disengaging the pawl from the teeth, the piston 76 reaches the limit of its relative lost-motion and engages the enlargement of the piston rod, moving it together with the heel clamp 32 to release the shoe.

The heel clamp is retained in shoe releasing position separated from the toe rest against the force of the spring 84 so that a new shoe may be applied to the jack conveniently. For this purpose the heel clamp arm 32 has pivotally mounted within the recess formed therein a latch 106 engaging a flange at the left end of the cylinder 34. The latch 106 is pivoted on a pin 108 passing through the heel clamp arm and is yieldingly engaged with the cylinder by a spring 110 compressed between the latch and a recess in the heel clamp arm. After air under pressure has been admitted to the cylinder 34 and a shoe released from the jack, the air in the cylinder is vented through the valve 68, the latch 106 retaining the heel clamp in a retracted position, as shown in Fig. 5, and preventing reclamping the lasted shoe before it has an opportunity to be released completely.

To clamp a new shoe between the toe rest and the heel clamp after the pressure of the air on the piston is vented, the latch 106 is released from the shoulder on the cylinder 34. The spring 84 forces the heel clamp against the shoe, clamping it against the toe rest. The heel clamp has its shoe engaging portion constructed, as seen from above, in V-form to receive the shoe heel between its diverging sides. The width at the top of the V is greater than at the lower portion, causing the shoe to be wedged upwardly. To prevent the heel end of the shoe from being forced upwardly by the greater width at the top of the V, the upper side of the clamp has secured to it a heel gage 112 (see Fig. 2) projecting across the open area of the V.

The toe rest also is suitably shaped to insure proper clamping action on the shoe. For this purpose the toe rest has an inclined chute 113 along which the toe of the shoe slides upwardly until it engages a toe gage 114 disposed angularly with respect to the length of the shoe. The toe gage acts to depress the toe of a shoe downwardly against a toe engaging pad 116 above the chute and causes the toe of a small-sized shoe to enter further within the chute than that of a large-sized shoe.

When a shoe is introduced between the heel clamp and the toe rest it is pressed into the heel clamp where it engages a button 118 adjustable on a horizontal spring pressed plunger 120 mounted for sliding movement and located within the apex of the V at a position where it is engaged by the shoe when the shoe is moved lengthwise against the heel clamp. The plunger 120 projects to the left from the heel clamp and has attached to it a yoke 122 within which is rotatably mounted a roll 124. The roll 124 is disposed within a slot in one arm of a lever 126 fulcrumed on a pin 128 carried by rearwardly projecting lugs on the heel clamp. The lever 126 has a fork in its other arm to surround a pin 130 (see Fig. 5) mounted in the latch 106. The forward arm of the lever is so shaped that as the roll 124 is moved toward the left it quickly actuates the lever from its solid line position to the dot-dash line position, in which the latch 106 is disengaged from the shoulder on the cylinder 34. The heel clamp is then bodily released for movement by the spring 84 toward the right, forcing the shoe against the toe rest and clamping it in position.

For convenience in adjusting the toe rest to shoes of different styles the chute 113 and the toe gage are constructed integrally on a slide with inwardly directed tongues engaging guiding grooves, one of which is shown at 132 in the toe rest arm 30 arranged to guide the chute and the toe gage vertically on the toe rest arm. To adjust the vertical position of the toe rest on the toe rest arm, the toe rest is threaded to receive a vertical thumb screw 134 mounted for rotation near its upper end but held against lengthwise movement in a lug 136 projecting from the toe rest arm.

With the shoe clamping and unclamping means on the cradle of the present machine, the flexible casing 70 exerts no appreciable influence in the way of restraining movements of the cradle as it is shifted transversely to the length of a shoe to cause the pivot axis 20 to intersect the center line 21 of a shoe along that part of the shoe engaged by the lasting units. Neither are the lengthwise feeding movements of the shoe restricted by the flexible casing. The mass of the jack being greatly reduced from that found in prior machines a substantial reduction in inertia effects results so that a shoe being operated upon is brought more quickly and accurately into operating position after each feeding movement than in prior machines. Furthermore, the valve 68 for controlling the compressed air introduced into the cylinder 34 is so arranged that pressure is applied to the flexible casing only after all lasting operations have been completed. Accordingly, any increase in rigidity imparted to the casing by the compressed air will not offer resistance to the positioning movements of the shoe during lasting. After the compressed air finally has actuated the piston 76, the heel clamp is latched and the air pressure vented. Thus, the stiffening effects of the air pressure on the casing will not interfere with the bringing of a newly jacked shoe into proper position relatively to the lasting units before restarting the machine in operation.

In the illustrated machine the pattern cam shafts 12 and 14 are given complete 360° rotations for each shoe operated upon and are brought to rest in predetermined stopping positions by the driving and stopping mechanism. During the major part of each pattern cam shaft rotation a series of twelve lasting operations are performed after which the operations are terminated. After the twelfth operation, the jacked shoe is automatically disengaged from the operating devices and the machine finally brought to rest in a position ready to receive a new shoe. During the final rotary movements of the pattern cam shafts the lasting units and their operating parts are reset for renewed operation. At the extreme end of the final rotation of the cam shaft 12 the abrupt drop portion 54 of the cam 52 is engaged by the follower on the cam lever 56 for actuating the air pressure control valve 68. While the cam shafts have substantially completed their movements at this time there may be a delay before many of the parts of the machine including the jack frame and its supporting structure reach a position of rest and before the cam follower engages the abrupt drop on the cam 52, so that pressure applied to the cylinder 34 may impart an unclamping movement to the heel clamp before the jack comes to rest in its reset position. On this account the jack may be subject to impacts and vibration while the shoe is being unclamped to such an extent that complete release of the shoe is not effected.

The delay in completion of the jack resetting movements is more pronounced than it otherwise would as a result of the use of motion retarding hydraulic snubbers, one of which comprises a cylinder 138 shown in Fig. 2. The cylinder 138 is mounted on the machine frame and is provided with a piston connected through a link 140 to an arm 142 projecting from the pivot 50 to which the jack base 48 is secured. The snubber cylinder 138 thus retards return movement toward the right of the jack. Another snubber retards the jack feed mechanism and is shown in the form of a cylinder 144 enclosing a piston carrying rod 146 secured to a bracket 148 mounted on the inside of the machine frame. The cylinder 144 is moved upwardly by a pair of tension springs 150 connected at their upper ends to the bracket 148 and at their lower ends to eye-bolts 152 made fast in a flange projecting from the sides of the cylinder. The lower end of the cylinder is connected through a cable 154 to the jack feed mechanism in a manner more fully to be described.

To insure unclamping a shoe in spite of impacts and vibration to which the jack is subject, the pattern cam shaft 12 has interposed between it and the illustrated control valve 68 a time delay inertia member for retarding release of the unclamping pressure in the pneumatic system. The time delay inertia member insures that the air pressure is vented by the valve 68 only after the jack has come to rest in its completely reset position with the shoe released and the heel clamp latched in unclamping position. The inertia member is connected to the actuating lever through a gear segment at its upper end engaging a pinion 156 secured to a fly wheel 158 rotatably mounted on a shaft 160 made fast at its ends in parallel arms of a bracket 162. The bracket 162 is bolted to the rear wall of the hollow frame 4 just above the pump 60. The bracket also provides a mounting for the control valve, a projection from the bracket having a vertical passage threaded at both ends to receive a nipple 164 at its upper end threaded into the valve 68 and to receive an elbow fixture 166 at its lower end connected with the tube 66.

The fly wheel 158 has projecting from one side a pair of pins 168 and 170 located to move against a forwardly projecting arm on a lever 172 fulcrumed on a stud 174 threaded into the projection of the bracket 162. An upwardly extending arm of the lever 172 is pivotally connected with a link 176 constructed with a U-shaped portion at its upper end perforated to receive pivots 178 (see Fig. 8) at opposite sides of a sleeve 180 surrounding the valve 68. The upwardly extending arm of the lever 172 and the link 176 form a toggle for actuating the valve. Along the section of the valve on which the sleeve 180 is mounted there is a partition blocking the central passage of the valve and above and below the partition are two series of radial holes 182 and 184. The sleeve 180 is formed with an internal annular space 186 which acts when the sleeve is raised to the broken line position to admit air from the holes 184 to the holes 182, causing air pressure to be applied through the flexible casing 70 to the cylinder 34 in the jack cradle. When the sleeve is lowered into its solid line position the holes 184 are closed and the holes 182 are uncovered, venting the air from the cylinder and flexible casing at atmospheric pressure. To prevent leakage from the space 186 in the sleeve, it has mounted within it a pair of sealing washers 187 pressed against the end walls of the space by a spring 188.

During operation of the machine on a shoe the cam 52 moves the lever 56 gradually from the position of smallest radius on the cam shown in Fig. 7 to the position of greatest radius swinging the cam lever in a clockwise direction about its fulcrum 58. After the final lasting operation of the lasting units on a shoe the fly wheel 158 is rotated until the pin 170 engages the upper surface of the forwardly projecting arm of lever 172, displacing the arm until the upwardly extending arm of lever 172 is brought into alinement with the link 176 raising the sleeve 180 to the broken line position of Fig. 8. Air is thus admitted to the cylinder 34 to move the heel clamp 28 to unclamping position.

As the machine is brought to rest at the end of the final lasting operation the follower on the lever 56 engages the abrupt drop 54 of the cam and the lever is rotated is a counterclockwise direction by a spring 189 stretched between a bolt 190 clamped within an arcuate slot 192 in the lever and a pin 194 on the bracket 162. As the lever 56 is moved in a counterclockwise direction the fly wheel 158 is rotated until the pin 168 engages the underside of the forwardly projecting arm on the level 172, bringing the toggle formed by the arm and the link 176 into misalinement, as shown in Fig. 7. As the toggle moves into the position of misalinement, a spring connecting stud 174 and one of the pivots 178 moves the sleeve 180 into its lowermost position venting the air in the cylinder 34 at atmospheric pressure. By delaying the time at which the air pressure is vented it is possible to insure release of a shoe and positive latching of the heel clamp 28 by the latch 106 in shoe releasing position. To enable the alined position of the toggle to be adjusted the link 176 is limited in its movement by engagement with a stop screw 196 carried by the bracket 162.

For providing means to enable convenient adjustment of air pressure and to permit escape of air from the reservoir 64 during operation of the machine, the lower end of the reservoir has threaded into it a needle valve 198. The needle valve is adjusted with relation to the output of the pump so that the pressure of air in the reservoir is maintained constant while the openings 184 in the control valve 68 are closed. The location of the needle valve 198 at the lower end of the reservoir also prevents accumulation of moisture in the reservoir so that no drainage of condensate from the pneumatic system or other special attention is required.

To prevent damage to the valve 68 from impact and rebound as a result of the engagement between the pins 168 and 170 with the lever 172 as the fly wheel 158 is rotated a shock absorbing connection is interposed between the fly wheel 158 and the valve. For this purpose the fly wheel is bored radially to receive a number of spring pressed plungers, one of which is indicated in Fig. 5 at 199 engaged with the shaft 160 on which the fly wheel rotates. The plungers afford sufficient frictional resistance to rotation of the fly wheel to reduce the impact and rebound of the pins against the lever 172 to an insignificant intensity.

Figure 15:
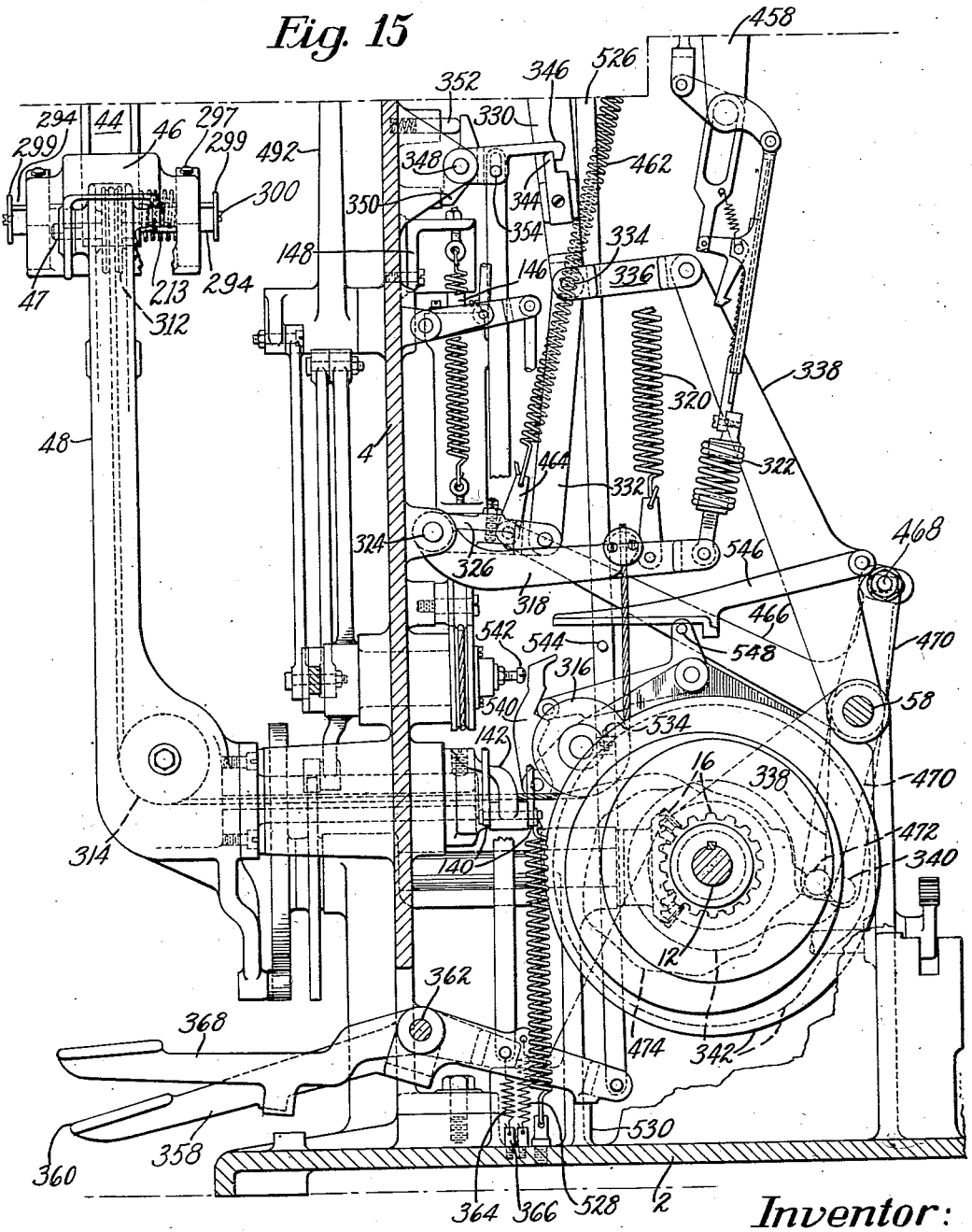
Fig. 15 is a sectional view in right side elevation of the lower front portion of the machine.

For shifting the pivot axis of the rocking mounting for the shoe supporting cradle transversely of the rocking axis to bring it into coincidence with the curved center line of the insole progressively, mechanism is provided which is similar to that disclosed in Patent No. 2,660,739 and is illustrated in Figs. 1 to 5 and 13 of the present drawings. Instead of employing a countershaft separate from the pattern cam shafts as in Patent No. 2,660,739 to shift the pivot axis, the present machine utilizes cams mounted directly on the pattern cam shaft 12 which is rotated a full 360° for each operation on a shoe and connections between the cams and the jack, including a flexible Bowden wire. An advantage also provided in the present machine not found in the prior machine is the capability in adjustment of shifting movement imparted to the shoe and cradle relatively to the pivot axis of the cradle during operation of the machine on a shoe. Thus, it is possible for the operator to make a correcting adjustment for balancing more accurately the pressures of the abutments 8 on a shoe bottom whenever it appears that such adjustment is needed without stopping the operation of the machine. As in the prior patents the shoe supporting cradle is shifted relatively to the rolls 38 and 39 to bring different portions of their engaging slots into contact with the rolls as the lasting operation progresses so that the abutments 8 will always engage the insole of a shoe equal distances at either side of the center line 21 drawn between the sewing ribs. To this end the guideway block 40 is secured to the offset arm 30 and has a slot engaged by a roll 201 (see Fig. 4) rotatably mounted at the forward end of a short strap 202. The strap 202 is secured at its rearward end to a sliding yoke 204 mounted on a guideway 206 secured in turn to the jack frame 44 by screws 208, as in the machine of the patent. The yoke 204 is connected to the Bowden wire, indicated at 210, through a rod 211 secured at one end to the yoke and at the other end to the wire. The sheath of the Bowden wire, indicated at 212, is connected to a downwardly extending arm of the guideway 206 so that relative movement between the wire and the sheath shifts the cradle relatively to the fulcrum rolls 38 and 39. The Bowden wire and sheath are bent through 360° to form a circular coil and to resist the force tending to uncoil the wire and sheath. The jack frame 44 and the arm 46 have disposed between them a coil spring 213 (see Fig. 15), the spring substantially balancing the force of the wire and sheath. The other ends of the Bowden wire 210 and sheath 212 extend to adjustable cam actuating mechanism, shown in Fig. 13, the sheath being secured to a bracket 214 mounted on the machine frame 4 and the Bowden wire being connected to one end of a rod 216 secured to a trunnion block 218. The trunnions of the block 218 project into openings in the upwardly extending forked arm of a lever 220, the block being positioned within the fork. The lever 220 swings on a fulcrum stud 222 fixed to the bracket 214 and the lever has a rearwardly extending arm pivotally connected to the upper end of an adjustable vertical rod 224 pivotally connected at its lower end with one link 226 of a toggle, another link 228 of which is joined to the link 226 by a bolt 230. The link 228 also is pivotally connected by a pin 232 with a short link 234 pivotally connected at its lower end with a rearward arm of a slotted lever 236 by a pin 238 displaced at right angles to the pin 232 at the upper end of link 234. The lever 236 is fulcrumed on a stud 240 carried between flanges on a mounting bracket 242 secured by cap screws 243 to the rearward side of the machine frame 4, the flanges of the bracket projecting through an opening within the frame.

To balance the offsets in the toe and heel supporting arms 30 and 32 and the weight of the square cylinder 34, the toe rest end of the cylinder has secured to it a vertical brace 244 between the upper angular bent end of which and a vertical thumb screw 245 there is compressed a coil spring 246 (see Figs. 2 to 5, inclusive). The thumb screw is threaded through a boss projecting from the left side of the sliding yoke 204 so that as the cradle and yoke are moved transversely of the length of the shoe both ends of the spring 246 will be moved in the same direction. To compensate for slight manufacturing inequalities the thumb screw is operated to increase or decrease the compression of the spring 246.

To enable adjustment of the shifting movement imparted to the shoe and cradle relatively to the pivot axis of the rocking mounting for the cradle, the lever 236 (Fig. 13) comprises a portion of a set of adjusting connections. For this purpose the forward end of the lever is slotted and has slidably mounted therein an H-shaped block 247 carrying a pin 248 passing through the lower end of a vertical link 250. The upper end of the link 250 similarly has passing through it a pin 252 carried by an H-shaped block 254 slidingly mounted in a slotted arm of a lever 256 rotatably mounted on the shaft 58 and provided with a roll 260. The roll 260 engages selectively with a pair of pivot axis shifting cams, indicated at 262 and 264, keyed to the pattern cam shaft 12 and movable lengthwise thereon as a unit. Movements of the pin supporting blocks 247 and 254 along the slots of the levers 236 and 256, respectively, increase or decrease the extent of shifting movement imparted through the connections just described to the cradle, relatively to the axis of the roll 39 on which the cradle rocks.

For moving the pin supporting blocks 247 and 254 along the slots of the levers 236 and 256, respectively, the link 250 is slidingly mounted in a box comprising a vertical channel block 266 and a cover plate 268 secured to the block (see Fig. 12). The block 266, in turn, is secured to a T-shaped slide 270 slidingly mounted in a horizontal guideway formed in the bracket 242, the block 266 acting as a cover for the guideway in the bracket 242. The forward end of the slide 270 has a vertical slot through which passes loosely a bolt 272 clamped to the lower end of a lever 274 fulcrumed on a pin 276 (Fig. 13) carried by an upstanding arm on the bracket 242. The upper arm of the lever 274 is pivotally connected to a horizontal notched manually actuated bar 278 projecting forwardly through an opening in the front wall of the frame 4. At the forward end of the bar 278 is a handle knob 280 and the notches in the lower edge of the bar engage a V-shaped edge within an opening of a plate 282 through which the bar passes, the plate being screwed to the frame 4 with its opening in register with the opening in the frame. To press the notches on the bar securely against the V-shaped edge of the plate 282, the upper surface on the bar is engaged by a spring pressed plunger 284 slidingly mounted in a forwardly projecting lug on the plate 282. By raising the handle knob at the forward end of the manually actuated bar 278 against the downward force of the spring pressed plunger 284, the notches on the bar are disengaged from the plate 282 and the bar may be moved lengthwise, imparting bodily movement to the link 250 so that the effective lengths of levers 236 and 256 are changed in reverse directions. In this way the shifting movements of the rocking axis for the shoe supporting cradle may be adjusted even while the machine is in operation.

In the illustrated machine the cam 264 is effective to shift the rocking axis for the cradle during lasting operations on a right shoe and the cam 262 is effective for shifting the rocking axis for the cradle while operating upon a left shoe. These cams are constructed with different shapes to impart the proper shifting movements but are formed with equal radii at adjacent points along their peripheries which are engaged selectively by the roll 260 as the machine approaches a stopping position. To facilitate transferring the cradle shifting cams toward and from engagement with the roll 260, the peripheries of the cams are notched at their stopping position of engagement with the roll and a rectangular guide bar 285 is inserted in the notches bridging the space between the cams. With the use of the guide bar 285, the cams may be moved along the shaft 12, the guide bar sliding beneath the roll 260 so that no separate mechanism is required to raise the roll from engagement with the cams. To maintain the roll continuously in engagement with one of the cradle shifting cams the point of pivotal connection between the upper end of the rod 224 is formed by a pin 286 passing through the hooked lower end of a tension spring 287, the upper end of which is secured to the machine frame 4. The spring 287 is of sufficient strength to overcome the weight of the bar 224 together with links 226, 228 and 234 while bringing the roll 260 into effective engagement with the cradle shifting cams.

With the use of cradle shifting cams 262 and 264 which turn a complete 360° rotation during lasting operations on a shoe and are provided with a common guide bar 285 for the roll 260, it is necessary to impart a fixed cradle axis shifting movement as the cam for a left or right shoe is engaged or disengaged with the roll 260. For this purpose the toggle links 226 and 228 have rotatably mounted on their central joint stud 230 a roll 305 (see Fig. 13) engaged with a vertical slot in an upstanding arm 288 rigidly secured to a horizontal sliding bar 289. The bar 289 also has bolted to it a forked arm 290 (see Fig. 9) extending at its forked end into a groove 291 formed in a hub connected to the cams 262 and 264. With this arrangement the cams 262 and 264 are moved together along the shaft 12 to bring either into engagement with the cradle shifting roll 260 at the same time that the central joint of the toggle links 226 and 228 is moved. In operating upon a right shoe when the cam 264 is moved into line with the roll 260 the alinement of the toggle links 226 and 228 is broken as shown in Fig. 12, thus, moving the axis of rocking movement for the cradle a fixed distance. When the cam 262 is moved into line with the roll 260 for a left shoe the toggle links 226 and 228 are moved into alinement and the cradle mounting pivot axis is shifted forwardly a fixed distance.

In the machine of Patent No. 2,201,866 the base of the jack supporting structure which is rotatably mounted in the base of the machine has pivotally mounted upon it the lower end of an arm arranged to swing about a horizontal axis disposed at right angles to the pivot for the jack base so that slight lateral movement of the jack frame transversely to the pivot axis of the cradle may occur during lasting operations and also additional swinging movement of the jack frame may take place to bring a shoe into and out of operating position with relation to the lasting units. Swinging movement of the jack frame about the base is necessary where a lasted shoe must be removed manually before a new shoe is applied to the jack. In the present machine where a completely lasted shoe drops by gravity from the shoe clamping cradle, swinging movement of the jack supporting arm about the base is no longer necessary. Accordingly, the vertical arm 48 is rigidly connected to the base and forms an integral part thereof.

To accommodate lateral movement of the jack frame transversely and to the length of a shoe on the cradle during lasting operations under the guiding action of the lasting devices on a shoe and the operation of the cradle shifting mechanism, the pivotal connection between the horizontal channelled link 46 (see Figs. 2 and 3) and the jack frame 44 is arranged with its axis directed parallel to the base pivot 50 with freedom for substantial relative movement of the jack frame lengthwise of the jack frame pivot. The illustrated jack frame pivot is formed by a shaft 292 passing through the lower end of the jack frame. The shaft 292 is secured to the frame by a pin 293. The shaft 292 projects at either side of the jack frame and has its outside diameter somewhat reduced to fit within square bearing blocks 294. The bearing blocks are guided for movement lengthwise of the shaft 292 through contact with two sets of friction reducing rolls 295 engaging the outer flat surfaces of two blocks 294 mounted in parallel side flanges of the link 46. There are four rolls 295 for each bearing block 294 and the rolls are mounted in angularly disposed slots formed in the parallel flanges of the link 46. To retain two of the rolls within each flange of the link 46 each flange is formed with openings to receive two eccentric pins 296, the eccentric portion of which passes through these rolls. For convenience in assembly each flange of the link 46 is in two parts divided horizontally and the two parts in each flange are held together by clamp bolts 297 (Fig. 2). On separating the parts of each flange a supporting pin 298 for a third roll 295 which cannot conveniently be exposed is made accessible. The axes of the rolls intersect each other at right angles and are disposed at a similar angle to the pivot axis of the shaft 292. For the lowermost rolls 295 a horizontal screw 303 passes through the link 46 and the roll in each flange. To limit the axial movement of the shaft 292 on the rolls 295, each end of the shaft carries a washer 299 (see Fig. 15) secured by a screw 300 passing through the washer into a threaded opening in the shaft. As the jack frame moves forwardly or rearwardly the washers engage the faces of the link 46.

To press an insole of a jacked shoe into yielding engagement with the abutments 8 in the lasting units, the link 46 has a downwardly extending lug supporting a pin 301 (see Fig. 2) passing through the upper end of a link 302 connected at its lower end with a jack raising cable 304. The cable 304 draws the link 302 upwardly to press a roll 306 rotatably mounted at the lower end of the link against the inner surface of a channel-shaped guide 308 secured by bolts 310 to the base arm 48. The cable 304 passes upwardly from the link 302 to a pulley 312 mounted on the pin 47 and downwardly around a pulley 314 through the hollow center of the base pivot 50 and upwardly about a pulley 316 within the frame of the machine (see Fig. 14). The inner end of the cable is secured to one arm of a lever 318 having a second arm connected with jack raising springs 320 and 322 arranged in a manner similar to that disclosed in Patents Nos. 2,201,866 and 2,660,739.

At the end of the lasting operations on a shoe the lever 318 is depressed against the force of the spring 320 so that the shoe is disengaged from the abutments 8 before being released from the clamping means on the cradle. To depress the jack raising lever 318 a fixed shaft 324 on which the lever 318 is fulcrumed has rotatably mounted upon it along the side of the jack raising lever a depressing arm 326 (Fig. 14). Pivotally connected between the free end of the arm 326 and a shaft 328 secured in the frame of the machine is a toggle comprising links 330 and 332, the central pivot 334 of which is connected by means of a link 336 with a lever 338 rotatably mounted on the shaft 58. The lower arm of the lever 338 carries a cam roll 340 engaging a groove in a cam 342 secured to the pattern cam shaft 12. At the end of the lasting operations on a shoe the cam 342 actuates the lever 338 to bring the toggle comprising links 330, 332 toward straightened positions causing the completely lasted shoe to be disengaged from the lasting units so that it will drop freely from the heel and toe clamping members of the jack.

In the prior machine the toggle for depressing the jack raising lever is actuated by a cam on the pattern cam shaft slightly beyond alined position so that it is retained therein by the force of the jack raising spring. In starting operations on a new shoe it is therefore necessary first to move the toggle to an alined position and then to move it beyond the alined position before the jack is free to move upwardly so that the new shoe may be released for upward movement toward the lasting devices. Movement of the toggle toward an alined position requires forcible extension of the jack raising spring which is of substantial strength, so that under some circumstances appreciable resistance is met in releasing the jack for upward movement.

To avoid the resistance met in moving the jack depressing toggle past a position of alinement in the illustrated machine, the toggle link 330 has secured to opposite sides thereof a pair of detent blocks, one of which is shown at 344 in Fig. 14, arranged to be engaged just before the toggle reaches a position of alinement by a pair of latches 346 rotatably mounted on a fixed shaft 348. The latches 346 are secured to either side of a lever 350 disposed between them on the shaft 348 and engaged on one arm with a spring pressed plunger 352 and provided with another downwardly extending arm acting against a lug on the machine frame for limiting the downward movement of the latch by the spring pressed plunger. To release the detent blocks on the toggle from the latches, they have extending between them a pin 354 passing through a slot in the upper end of a link 356, the lower end of which is pivotally connected to a foot actuated toggle releasing lever 358. The forward end of the foot lever 358 has a foot pad 360 (see Figs. 1 and 15) and the lever is fulcrumed on a pin 362 secured in the machine frame 4. To retain the foot pad 360 in its raised position the rearward end of the lever is engaged by a spring 364 stretched between the lever and a stud 366 on the machine base 2. Not only is the release of the jack depressing toggle effected with less effort by the latch arrangement described but also it is accomplished more quickly since less movement is required in the relatively heavy parts forming the toggle and in the mechanisms for moving them.

As in the prior machine the foot lever 358 is located close to a treadle lever 368 which is employed for starting the machine in operation so that both levers may be operated simultaneously or individually at the convenience of the operator.

In the machine of Patent No. 2,660,739, lasting units are provided comprising upper tensioning and fastening devices which are carried by supports arranged for turning movement about an axis substantially perpendicular to the bottom of a shoe being operated upon as it is fed lengthwise to enable these abutments on the lasting units to engage the sewing ribs on the insole squarely at angles corresponding to those of the ribs. To avoid foreshortening action and lost motion ordinarily encountered in the use of links and levers for turning the lasting units, the illustrated machine is constructed with unit turning mechanisms having cable connections and pulleys rather than links and levers and a simplified and improved adjusting device is provided for the unit turning mechanism which co-operates in a particularly advantageous manner with the cable connections.

Referring to Figs. 18, 19 and 20 the lasting unit turning mechanism is shown with connection cables, indicated at 370, secured to clamps carried by grooved collars 372 fixed to the upper ends of the lasting unit supports 22. There are two cables 370, each of which is secured between its ends to a single collar 372. The cables 370 pass over pulleys 374 rotating on vertical axes and over other pulleys 376 rotating on horizontal axes. The lower ends of the cables are secured to clamps carried by the larger ones 378, of a pair of concentrically mounted grooved wheels, the smaller ones 380, of which are fixed one to each larger wheel. Both pairs of grooved wheels 378 and 380 are rotatably mounted on a horizontal shaft 382 carried by a bracket 384 made fast to the frame 4 by screws 386. Rotation of either pair of grooved pulleys 378, 380 causes rotation of the connected support 22. To rotate either pair of grooved wheels 378, 380 each larger wheel has an eccentrically mounted pin 388 about which is hooked one end of a tension spring 390, the other end of which is similarly hooked about a pin 392. Each pin 392 projects radially from the hub of a two-armed lever 394, the arms of which are parallel and carry followers in the form of rolls 396. The lever 394 is fulcrumed on the shaft 58 and between its arms is disposed a second lever 398 carrying a follower roll 400 so arranged that when the arms of the two levers are located at the same angle about the shaft 58, the rolls 396 and 400 will be axially alined with each other. One of the rolls 396 and the roll 400 always bears against the outer surface of a pair of unit turning cams 402 and 404 keyed to the pattern cam shaft 12 against relative turning movement but capable of axial movement thereon.

The cam 404 is shaped to produce the proper turning movement in the lasting unit support for operating along the inside shank of a shoe and the cam 402 similarly for operating along the outside shank of a shoe. In the positions of the cams 402 and 404, shown in Fig. 18, the cam 402 acts on the roll 400 of lever 398 and the cam 404 acts upon one of the rolls 396 of the lever 394. To maintain the rolls in engagement with the cams the extreme ends of the levers are connected with tension springs 406 stretched between the levers and the machine frame. For transmitting motion from the levers to the grooved wheels each lever passes through a slot in a saddle 408 having at its lower end a pin 410 mounted in the saddle for engagement with the under surface of the lever. The upper end of each saddle has pivotally connected to it a terminal block 412 for a pair of parallel cables 414 passing over the smaller grooved wheels 380 and having their ends secured thereto. The springs 390 maintain the cables 414 in constant tension so that as the follower levers 394 and 398 have their rolls drawn against the cams 402 and 404, the grooved wheels will follow the movements imparted to the levers by the cams, the springs 390 being weaker than the springs 406 so that there will be no tendency for the rolls to be disengaged from their cams.

To increase or decrease the turning movement imparted to either lasting unit support 22 to match the lengthwise curvature of a particular style of shoe being operated upon, it is only necessary in the present illustrated machine to depress one of the saddles 408 against the force of its corresponding cable tightening spring 390 until the pin 410 is disengaged from one of a series of notches 416 cut into the under surface of the levers, the saddles being moved farther away from or toward the shaft 58 on which the particular lever is fulcrumed. This construction is not only less expensive to manufacture than that of Patent No. 2,660,739, but is more effective for the purpose intended.

With the positions of the cams shown in Fig. 18 the machine is ready for operation upon a right shoe, the cam 404 imparting proper turning movements for the inside shank of the shoe to the forward lasting unit support 22 and the cam 402 imparting proper turning movements to the rearward support for the outside shank of the shoe. To shift the cams along the shaft 12 they are secured together by an integral hub having a radial groove into which fits a pair of rolls 418 mounted on spaced arms of a yoke 420 secured to an intermediate part of a shaft 421 best shown in Figs. 9 and 12. The shaft 421 is rotatable in lateral projections from the bearing flanges on the machine base 2 and at its forward end the shaft has pinned to it an arm 422 connected through a link 423 with a substantially parallel arm 424 fixed to the rearward end of a shaft 425. The shaft 425 is rotatable in a bearing on the base 2 of the machine and has fastened to its forward end a double armed treadle lever 426 extending into a position accessible for convenient operation by the machine operator. The arms of the treadle lever 426 extend from the shaft 425 at approximately 120° apart so that the shaft may be rocked in either direction by depressing the proper treadle lever arm. When the treadle lever 426 is operated the cams 402, 404 are moved along the shaft 12, one of the cams being shifted from engagement with one of the rolls 396 and into engagement with the roll 400 so that a proper movement of the follower lever 394 is produced. A corresponding shift of the other cam from the roll 400 to one of the rolls 396 also occurs. For convenience in shifting the cams with respect to the rolls on the follower levers the cams are notched at points about their peripheries engaged by the rolls when the machine is stopped after completing operations upon a shoe and a transfer block 427 is inserted in the notches to bridge the gap between the cams. Thus, the rolls slide readily across the space between the cams when they are moved along the shaft 12.

To provide a more effective means than heretofore employed for securing the lasting unit turning cables to the collars 372, or to the grooved wheels the illustrated machine is provided with cable clamps best shown in Fig. 20. These clamps comprise a pair of T-shaped plates 428 formed with complementary semicircular grooves 430. From one of the plates through an opening 432 in the other there projects a clamp bolt 434 for drawing the plates together against the cable which passes through a diametrical opening in the clamp bolt and lies within the grooves 430. The outer end of the bolt is provided with the usual nut 436 and a washer 438. After clamping a cable either between or at its ends the clamp is inserted within a T-shaped opening formed in the particular collar or grooved wheel for which it is intended, the location of the semicircular groove 430 in the plates lining up with the cable receiving groove in the collar or wheel as the case may be. One advantage of this clamp is that it may be loosened conveniently to adjust the angle at which a lasting unit engages a sewing rib on the shoe as the machine is started.

In the machine of the prior patents it is necessary when changing adjustments for operation upon a right shoe to those required for operation upon a left shoe that a reversal of connections be made between the lasting unit supports and their turning mechanisms and also that other suitable changes be carried out in the mechanism for shifting the rocking axis of the shoe supporting cradle on the jack frame. The present machine is so arranged that it is no longer necessary to make two separate adjustments for these purposes, suitable connections being provided with the lasting unit turning cam control treadle lever 426 to make the required change in the cradle axis shifting mechanism at the same time. Accordingly, at the rearward end of the cam shifting shaft 421 (Figs. 9 and 12) is secured a gear segment 432 meshing with a similar segment 434 rotatable on a stub shaft 436 mounted in an upwardly curved arm 438 made fast to the rear face of a stanchion 440 projecting upwardly from the base 2. The stanchion 440 has a slot in its upper end through which the left end of the bar 289 passes and is retained by a cover plate 442. The bar 289 at the left side of the stanchion has a series of rack teeth 444 cut along its upper surface, which teeth mesh with the teeth of the segment 434. The connections thus provided move the cradle axis shifting cams 262 and 264 in the same direction along the pattern cam shaft 12 as the lasting unit turning cams 402 and 404 are moved by their actuating treadle lever 426. By so doing the two adjustments are made simultaneously, rendering the machine capable of interchangeably operating upon left or right shoes with a single treadle action.

The machine of the prior patents is provided with means for drawing the lasting units together at the end of the lasting operations on a shoe to bring the shoe engaging abutments to a position where they may enter between the sewing ribs of the smallest size of shoe intended to be operated upon. Before starting the machine upon a new shoe the lasting units are allowed to separate until the abutments engage the sewing ribs on the insole. The illustrated machine is equipped with simplified and improved means for accomplishing these same purposes but with a construction and arrangement which is made more effective and less expensive than the prior one.

To separate the lasting devices and bring the abutments 8 of the lasting units into engagement with the sewing ribs on a shoe in the present machine, yielding means, including suitable connections, are provided. The rearward cylindrical lasting unit bearing 23 has projecting from it a lug to which is pivotally connected a link 446 (see Figs. 11 and 16). The link 446 extends upwardly from the lug and is pivotally connected to one arm of a horizontal lever 448 fulcrumed on a shaft 450 secured at its ends in the head frame 6. Another arm of the lever 448 is pivotally connected to the upper end of a link 452, the lower end of which is similarly connected to an intermediate point on a unit separating lever 454 fulcrumed on a stud 456 carried by a bracket 458 bolted to the inside of the frame 4. The unit separating lever has pivotally mounted at its forward end a plate 460 connecting the upper end of a tension spring 462. The lower end of the spring 462 is connected to a plate 464 pivotally connected to one arm of a lever 466 rotatable on the shaft 58 (see Figs. 14 and 15). Another arm of the lever 466 is slotted to receive a clamp bolt 468. The bolt 468 also passes through an arm of a lever 470 rotatable on the shaft 58 and having at its lower end a roll 472 engaging a cam 474. Through the clamp bolt connection between levers 466 and 470 and the cam 474 the proper tension is imparted to the spring 462 to maintain the abutments 8 yieldingly in engagement with the sewing ribs on an insole as the widthwise spacing between the sewing ribs varies along the length of a shoe bottom.

For drawing the abutments 8 together at the end of a lasting operation the lever 454 has a rearwardly extending bifurcated arm between the furcations of which is rotatably mounted a roll 475. The roll 475 is engaged by a cam shaped rearward end of an arm 476 rotatably connected at its forward end to a right angle lever 478 mounted for free rotation on the shaft 328 between forked portions at the upper end of the toggle link 330. A forwardly extending arm of the lever 478 has a projecting ball portion engaged in a horizontal slot of a block 480. The block 480 has projecting downwardly from it a threaded stud engaged by a collared thumb nut 482 (see Fig. 14), the collar of which enters a slot in one arm of a horizontal lever 484 rotating on a stud screw 486 secured in the head frame 6 (see Fig. 2). The block 480 is mounted in wings of a cut out portion in the lever 484, a spring pressed plunger 487 in the lever entering indentations in the thumb nut to hold it against rotation. The other arm of the lever 484 carries a roll 488 (Fig. 2) acting on the undersurface of a cam plate 490 secured to a bell crank 492 rotatably mounted on a fixed pivot 494 and connected at its upper end to the toe end of the jack frame 44 through a feed link 496, the manner of operation and arrangement of which are the same as disclosed in Patent No. 2,201,866.

At the end of an operation on a shoe as the toggle links 330 and 332 move toward positions of alinement a projection on the link 330 comes into engagement with a similar projection 498 formed on the downwardly extending arm of a curved abutment spacing flanged lever 500 (Fig. 14), also freely rotatable on the shaft 328, the lever 500 having a hollow channel section cut away to clear the lever 478 and to admit the upper forked end of the toggle link 330 between its parallel flanges. At its upper end the abutment spacing lever 500 carries a roll 502 engaging an inclined surface on the arm 476, the arrangement being such that when the curved lever is actuated in a clockwise direction, as shown in Fig. 16, it will force the arm 476 downwardly against the roll 475 and cause the lever 454 to stretch the spring 462 and draw the lasting units and their abutments 8 together.

After being drawn together the lasting units are prevented from separation. For this purpose the spacing lever 500 is retained in position by a detent plate 504 secured to the left side of the spacing lever by screws 506 (Fig. 14). The detent plate is engaged by a latch 508 secured to a stud 510 rotatable in the bracket 458. The latch 508 is pressed toward detent engaging position by a spring 512 stretched between a pin on the detent plate and a pin on the latch. The positions of the parts with the curved lever latched are indicated in both Figs. 14 and 16, and these positions are retained until the machine is started on a new shoe. To maintain the roll 502 out of contact with the arm 476 during normal lasting operations so that the lasting units are free to separate against the sewing ribs of the insole, the lower end of the abutment spacing lever 500 carries a pin engaged by a tension spring 514 stretched between the pin and a fixed portion of the bracket 458.

The purpose of the cam plate 490 and roll 488 (Fig. 2) on the lever 484 is to position the abutments 8 properly for easy entry between the sewing ribs of an insole on a shoe and to adjust the preliminary spacing of the abutments to correspond to the size of a shoe being operated upon. The lower edge of the cam plate 490 is so shaped that as a jacked shoe is moved lengthwise to bring it into proper relation before starting operations on a shoe the levers 484 and 478 (Fig. 14) will move the cam end of the arm 476 over the roll 475 to cause the proper separation of the lasting units in accordance with the size of shoe being presented to the abutments. The thumb nut 482 provides additional means of adjustment of the connection levers 478 and 484, rotation of the thumb nut causing vertical sliding movement to be imparted to the block 480 along the cut out portion in the lever 484.

For releasing the latch 508 from the detent plate 504 before starting the machine, connections are provided between the latch and the starting treadle lever 368. These connections include an arm 516 also secured to the stud 510 and provided with a roll 518 engaged with the rearward edge on a vertical bar 520. The bar 520 is mounted for sliding movement in a bearing box formed by a boss on the bracket 458, having a rectangular slot closed at its right side by a cover plate 522 screwed to the boss. The bar 520 has on its rearward edge a cam projection 524 arranged when the bar is raised to swing the arm 516 in a direction to release the detent plate from the latch 508. Pivotally connected to the lower end of the slide bar 520 is a rod 526, in turn pivotally connected to the rearward arm of the treadle lever 368. The rearward arm of the treadle lever 368 also carries a horizontal pin connected to a treadle raising spring 528, acting to draw the treadle lever 368 downwardly against a projection 530 on the base 2 and to hold the cam projection 524 out of engagement with the roll 518 until the starting treadle lever is depressed. The rod 526 has secured to its right side an angle plate 532 (see Fig. 14) through which is threaded a set screw 534 arranged to engage a lever 536 when the starting treadle is actuated for securing the shoe size adjustment in the actuating mechanism for the shoe feeding bell crank 492. This mechanism has for this purpose a lock. For actuating the shoe size adjustment lock the lever 536 carries a roll 538 engaging a cam surface on an arm 540 rotatably mounted on a flange portion projecting upwardly from the base 2, which flange also provides a fulcrum mounting for the lever 536. When the lever 536 is actuated upwardly by the set screw 534, the arm 540 is pressed forwardly against an adjustable screw 542 mounted in a horizontally sliding plug for locking the size adjustable feeding mechanism more fully disclosed in Patent No. 2,201,866. At the same time that the rod 526 is raised to lock the feeding mechanism a pin 544 on the rod engages the undersurface of a horizontal link 546 pivotally connected at its rearward end to the toggle straightening cam lever 338. The link 546 rests on a pin 548 projecting from the lever 536 and a shoulder on the link moves the roll 538 downwardly as the machine completes its lasting operations to unlock the adjustable feeding mechanism. When the link 546 is engaged by the pin 544 it raises it from the pin 548 so that the pin 548 is free to pass under the shoulder on the link 546 as the feed mechanism lock is released.

Figure 17:
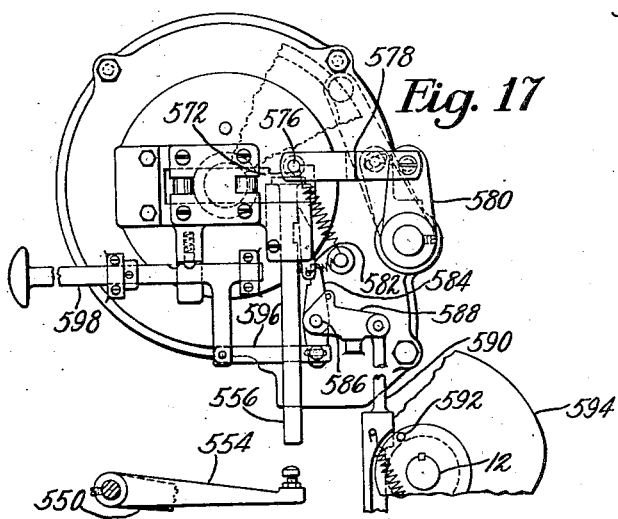
Fig. 17 is a detail view in right side elevation of the driving and stopping mechanism employed in the machine.

To start the machine in operation the slide bar 520 is disposed beneath the rearward end of an arm 550 secured to a rockshaft 552, best shown in Figs. 16 and 17. Fixed to the rockshaft 552 is a second arm 554 carrying a set screw arranged to engage the lower end of a vertically sliding member 556 in a driving and stopping mechanism similar to that disclosed in United States Letters Patent No. 2,423,852, granted July 15, 1947, upon a joint application of C. A. Robinson and the present inventor.

Briefly, the driving and stopping mechanism includes a driving member 558 (see Figs. 11 and 17), a driven member 560 keyed to but slidably mounted on a hollow portion of the main operating cam shaft 10 and provided with a surface co-operating with a braking ring 562 on the frame 6. The shaft 10 on which the driven member 560 is mounted has within it a compression spring 564 acting against a pin 566 passing through slots in the shaft 10 and into the hub of the driven member 560, the spring urging the pin and driven member toward the driving member. To disengage the clutch members and to bring the machine to rest the pin 566 is engaged by a plunger 568 within the shaft, carrying a roll 570 acting on a wedge shaped shifter member 572 slidably mounted in a housing 574 surrounding the driving mechanism. The shifter member is notched along its upper surface and is engaged by a pin 576 (Fig. 17) in a link 578 pivotally connected to an oscillating arm 580. When the vertically sliding member 556 is raised by depressing the starting treadle lever 368, the upper end of the member 556 raises the pin from the notch in the shifter member and the driven clutch member 560 is caused to engage and be driven by the driving member 558. To retain the sliding member 556 in raised position it has a notched side acted upon by a latch 582 controlled by a lever 584 fulcrumed on a pin 586. The lever 584 is controlled in part by an arm 588 pivotally connected to a stop rod 590 having at its lower end a shoulder arranged to be engaged by a pin 592 mounted on the hub of a cam 594 on the pattern cam shaft 12. When the lasting operations on a shoe are completed the pin 592 raises the stop rod 590 and the oscillating arm 580 forces the shifter member 572 in a direction to bring the operating shaft 10 to rest. Also connected to the lever 584 through a pin and slot connection is a horizontal link 596 connected to a downwardly extending arm of a slidable control bar 598. When the control bar 598 is drawn forwardly into the position of Fig. 17 it renders the latch 582 inoperative so that the machine may be maintained in operation only by holding the treadle lever depressed. When the bar 598 is pressed rearwardly the machine completes all the lasting operations on a shoe before coming to rest.

In the machine of Patent No. 2,201,866 the pattern cam shafts, corresponding to those illustrated in the present drawings at 12 and 14, are driven intermittently after operation of the lasting devices through an oscillating longitudinally moving lever driven by an eccentric on the operating cam shaft, the lever describing an elliptical path at its lower end to cause a pin secured thereto to engage one of a series of radial slots spaced at equal distances about the periphery of a disk on one of the pattern cam shafts. The use of the patented cam shaft driving lever is extremely effective for the purpose intended, providing a quick rotation of the pattern cam shafts, but at the expense of imparting relatively high accelerating and decelerating forces to the jack and shoe during each individual rotation of the operating shaft. Because of the high accelerating and decelerating forces vibratory action and impacts may occur which are detrimental and which actually delay the accurate presentation of a shoe to the lasting units. Accordingly, the actual time required to perform a lasting operation may thus be greater than if a slower intermittent rotation were imparted to the pattern cam shafts. In the present illustrated machine improved mechanism driven from the main operating cam shaft 10 is provided for intermittently rotating each cam shaft a fraction of a turn more slowly and with lower forces of acceleration and deceleration than in the patented machine while improving the reliability and accuracy with which the pattern cam shafts are brought to proper positions during each rotation of the operating shaft.

Figure 10:
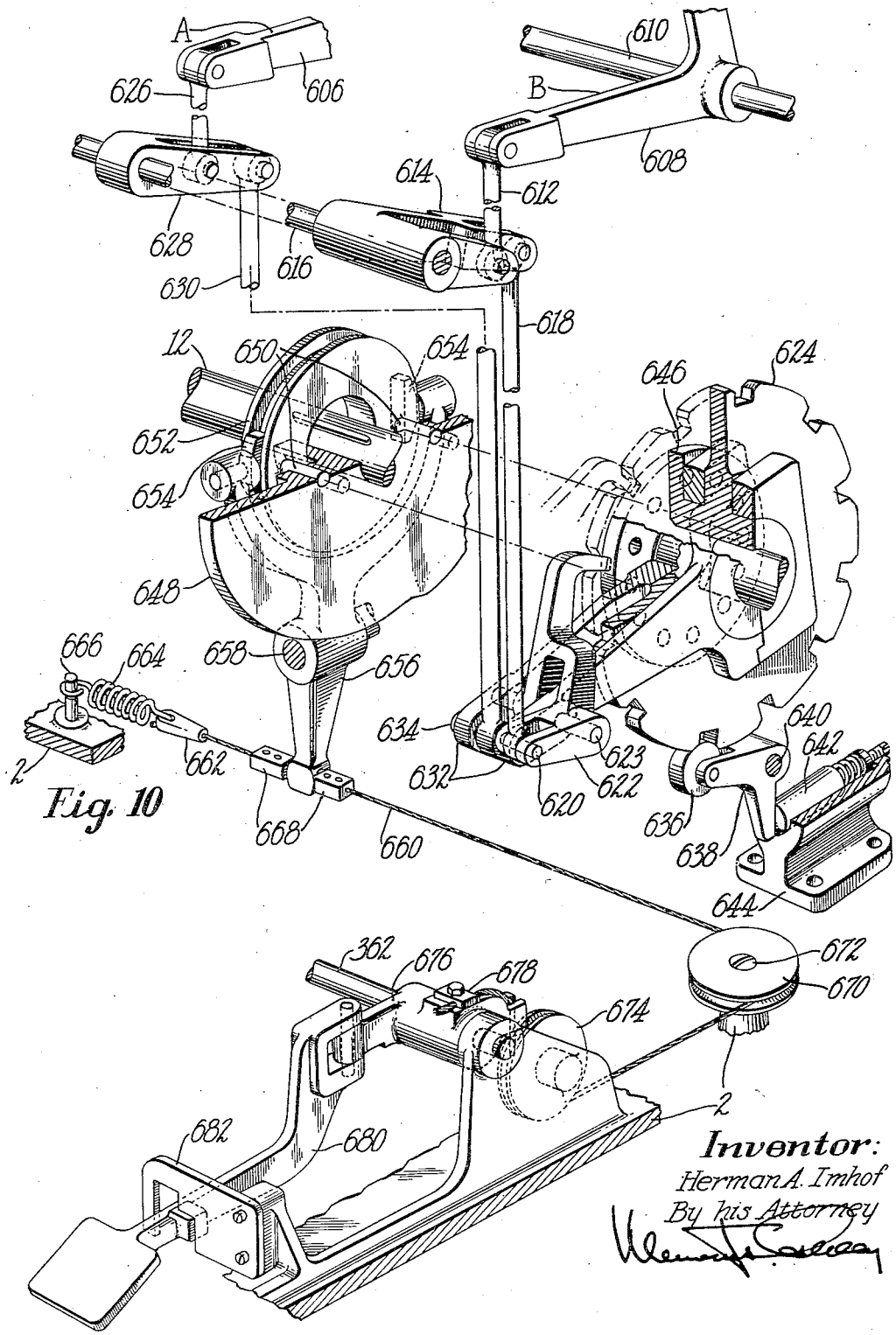
Fig. 10 is a perspective detail view looking from the right front of the machine illustrating the pattern cam shaft driving mechanism.

The illustrated improved pattern cam shaft rotating mechanism is shown in Figs. 10 and 11 and is driven by two separate cam grooves in opposite faces of a single cam disk 600 (Fig. 11) on the operating shaft 10. Engaging the grooves in the cam disk 600 are a pair of follower rolls 602 and 604 rotatably mounted on upstanding arms of a pair of cam levers 606 and 608. The levers 606, 608 are rotatably mounted on a shaft 610 mounted in the head frame 6, and these levers impart rotation to the pattern cam shaft through the engagement of a pawl with notches in the periphery of a disk mounted on the cam shaft 12. One of the levers actuates the pawl toward and away from the disk and the other lever moves the pawl bodily while in engagement with the disk to rotate the shaft. In this way forces of acceleration and deceleration are reduced to a minimum and a positive and accurate motion is imparted to the pattern cam shafts under the control of the grooves in the cam disk 600. Although the shapes of the grooves in the cam are such that a relatively greater part of each rotation of the operating shaft 10 is taken up by rotation of the pattern cam shafts, a smoother feeding action of the shoe from lasting position to lasting position occurs on a shoe.

Referring to Fig. 10, the lever 608 actuates the pawl toward and from the disk on the pattern cam shaft 12. For this purpose a horizontal arm of the lever is connected through a vertical link 612 with a lever 614 rotatable on a shaft 616 secured at its ends in the machine frame. The lever 614 is also connected to the upper end of a link 618, the lower end of which is connected by a pin 620 to the forward arm of a lever 622 (see also Fig. 9) comprising the pawl, mounted for rocking movement on a pin 623 toward and from the notched disk, indicated at 624, rotatable on the pattern cam shaft 12.

To move the pawl lever 622 bodily while in engagement with the disk 624 the cam lever 606 is pivotally connected to a link 626 similarly connected to a lever 628 also rotatably mounted on the shaft 616. The lever 628 is connected through a link 630 to the forward end of a double carrier arm 632 mounted for relative rotation on the hub of the disk 624, one part of the lever being mounted at either side of the disk. The pivotal connection between the link 630 and the lever 622 comprises a pin 634 (see also Fig. 9) and the parts of the lever are perforated to provide a support for the pin 623, the pawl lever 622 being forked to straddle one of the parts of the double carrier arm 632. As the cam disk 600 is rotated the pawl lever 622 enters a notch, as shown in the solid line position of Fig. 10, and is raised bodily while in engagement with the disk 624, a distance equal to that between successive notches, to the broken line position, and then rocked about the pin 623 away from the disk so that it may be returned to its solid line starting position. To prevent rotation of the disk while the pawl is being returned to its starting position the edges of the notches in the disk are beveled to fit the periphery of a roll 636 mounted in the slotted arm of a lever 638. The lever 638 is mounted for rocking movement on a pin 640 secured in the base 2 and a downwardly extending arm of the lever 638 is engaged by a spring pressed plunger 642 slidably mounted in a fixture block 644 secured to the base 2.

The disk 624 is detachably connected to the pattern cam shaft 12 in order to enable independent rotation of the operating cam shaft without actuating the pattern cams, in a manner similar to that disclosed in Patent No. 2,201,866.

For this purpose a pin clutch is provided comprising a perforated flange 646 on the hub of the disk 624, the perforations of which are equal in number and of the same angular displacement as the notches in the disk. Keyed to the shaft 12 is a disk 648 having diametrically spaced pins 650 slidable in openings therein. The pins 650 are secured to one side of a collar 652 slidable on the hub of the disk and are of sufficient length to enter into the openings in the flange 646. The collar 652 is provided with a peripheral groove engaged by swivel blocks 654 rotatably mounted in yoke arms of a lever 656. The lever 656 is mounted for swinging movement on a cross shaft 658 secured to a flange on the base 2 and the lower arm of the lever 656 is slotted to receive a cable 660 having fixed to one end a perforated block 662. The block 662 is connected at its left end to a tension spring 664 passing through the perforation therein and having one end engaged with a pin 666 on the base 2. At either side of the slotted lower arm of the lever 656 is a clamp block 668 for causing the lever to follow the movements of the cable 660. For actuating the cable it is led about a pulley 670 mounted on a stud 672 threaded into the base 2 and from the pulley 670 the cable passes under a second pulley 674 mounted on a base for rotation about a horizontal axis, the cable passing over the hub of an arm 676. The hub of the arm 676 has radial projections to prevent displacement of the cable and a clamp 678 for securing the cable in place.

To impart a lengthwise movement to the cable and to shift the pins 650 toward and from the flange 646 of the pin clutch the arm 676 is rotated on the horizontal shaft 362 mounted on the base 2. For this purpose the arm 676 has pivotally mounted upon it for horizontal swinging movement a pedal 680 extending through a step notch in a plate 682 fastened to an upstanding portion of the base 2. If the pedal 680 is depressed and swung toward the right, an enlargement thereon enters beneath the step in the plate 682 and moves the cable 660 and the lower end of the lever 656 to the right, disengaging the pins from the clutch flange 646. Movement of the pedal from the position shown in Fig. 10 to the left disengages it from the step in the plate 682 causing the pins to re-engage the clutch flange and so connect the pattern cam shaft 12 with the disk 624.

The invention having been described, what is claimed is:

1. A machine for use in the manufacture of shoes having a main frame, devices in the main frame for operating upon a shoe, a patetrn cam shaft in the main frame, a jack frame actuated by the pattern cam shaft and mounted for movement on the main frame, a shoe supporting cradle having a pivotal mounting on the jack frame, and clamping means on the cradle for releasably securing a shoe in a lengthwise position parallel to the pivot axis of the cradle mounting, in combination with connections operated by the pattern cam shaft between the pattern cam shaft and the clamping means for actuating the shoe clamping means, said connections including a flexible casing connected at one end to the main frame and at the other end to the cradle.

2. A machine for use in the manufacture of shoes having a main frame, devices in the main frame for operating upon a shoe, a pattern cam shaft in the main frame, a jack frame actuated by the pattern cam shaft and mounted for movement on the main frame, a shoe supporting cradle having a pivotal mounting on the jack frame, and clamping means on the cradle for releasably securing a shoe in a lengthwise position parallel to the pivot axis of the cradle mounting, in combination with connections operated by the pattern cam shaft between the pattern cam shaft and the clamping means for actuating the shoe clamping means, said connections including a flexible casing connected at one end to the main frame and at the other end to the cradle, and means controlled by the pattern cam shaft for exerting pressure on the shoe clamping means through the flexible casing to release a shoe from the clamping means.

3. A machine for use in the manufacture of shoes having a main frame, devices in the main frame for operating upon a shoe, a pattern cam shaft in the main frame, a jack frame actuated by the pattern cam shaft and mounted for movement on the main frame, a shoe supporting cradle having a pivotal mounting on the jack frame, and clamping means on the cradle for releasably securing a shoe in a lengthwise position parallel to the pivot axis of the cradle mounting, in combination with connections operated by the pattern cam shaft between the pattern cam shaft and the clamping means for actuating the shoe clamping means, said connections including a flexible casing connected at one end to the main frame and at the other end to the cradle, and means controlled by the pattern cam shaft for exerting pressure on the shoe clamping means through the flexible casing to release a shoe from the clamping means, the pressure exerting means including a compression pump and a pressure venting control valve actuated by the pattern cam shaft.

4. A machine for use in the manufacture of shoes having a main frame, devices in the main frame for operating upon a shoe, a pattern cam shaft in the main frame, a jack frame actuated by the pattern cam shaft and mounted for movement on the main frame, a shoe supporting cradle having a pivotal mounting on the jack frame, and clamping means on the cradle for releasably securing a shoe in a lengthwise position parallel to the pivot axis of the cradle mounting, in combination with connections operated by the pattern cam shaft between the pattern cam shaft and the clamping means for actuating the shoe clamping means, said connections including a flexible casing connected at one end to the main frame and at the other end to the cradle, means controlled by the pattern cam shaft for exerting pressure on the shoe clamping means through the flexible casing to release a shoe from the clamping means, the pressure exerting means including a compression pump and a pressure venting control valve actuated by the pattern cam shaft, and a time delay member connecting the pattern cam shaft with the valve to retard venting the pressure exerted on the clamping means until the shoe is fully released.

5. A machine for use in the manufacture of shoes having a main frame, devices in the main frame for operating on a shoe, a pattern cam shaft in the main frame, an operating shaft in the main frame for actuating the operating devices, connections between the operating shaft and the pattern cam shaft for rotating the pattern cam shaft intermittently a fraction of a turn after each operation of the operating devices, a jack frame actuated by the pattern cam shaft and mounted on the main frame, a cradle having a pivotal mounting on the jack frame, and spring actuated shoe clamping means on the cradle for clamping a shoe in a lengthwise position parallel to the pivotal axis of the cradle mounting, in combination with means for actuating the shoe clamping means against spring actuation including a snail cam formed with an abrupt drop on the pattern cam shaft, a follower engaging the snail cam and mounted for movement on the main frame at a position for actuation by the abrupt drop on the snail cam after the operations on a shoe have been completed, a pressure venting valve connected for actuation by the cam follower, a pump connected to the valve, a flexible casing between the valve and the shoe clamping means to release a shoe from the clamping means, and a time delay inertia member interposed between the cam follower and the valve to retard venting of the pressure through the valve until after a shoe is fully released from the clamping means.

6. A machine for use in the manufacture of shoes having a main frame, devices in the main frame for operating on a shoe, a pattern cam shaft in the main frame, an operating shaft in the main frame for actuating the operating devices, connections between the operating shaft and the pattern cam shaft for rotating the pattern cam shaft intermittently a fraction of a turn after each operation of the operating devices, a jack frame actuated by the pattern cam shaft and mounted on the main frame, a cradle having a pivotal mounting on the jack frame, and spring actuated shoe clamping means on the cradle for clamping a shoe in a lengthwise position parallel to the pivotal axis of the cradle mounting, in combination with means for actuating the shoe clamping means against spring actuation including a snail cam formed with an abrupt drop on the pattern cam shaft, a follower engaging the snail cam and mounted for movement on the main frame at a position for actuation by the abrupt drop on the snail cam after the operations on a shoe have been completed, a pressure venting valve connected for actuation by the cam follower, a pump connected to the valve, a flexible casing between the valve and the shoe clamping means to release a shoe from the clamping means, a time delay inertia member interposed between the cam follower and the valve to retard venting of the pressure through the valve until after a shoe is fully released from the clamping means, and a latch engaging the shoe clamping means to prevent reclamping the released shoe.

7. A machine for use in the manufacture of shoes having a main frame, devices in the main frame for operating on a shoe, a pattern cam shaft in the main frame, an operating shaft in the main frame for actuating the operating devices, connections between the operating shaft and the pattern cam shaft for rotating the pattern cam shaft intermittently a fraction of a turn after each operation of the operating devices, a jack frame actuated by the pattern cam shaft and mounted on the main frame, a cradle having a pivotal mounting on the jack frame, and spring actuated shoe clamping means on the cradle for clamping a shoe in a lengthwise position parallel to the pivotal axis of the cradle mounting, in combination with means for actuating the shoe clamping means against spring actuation including a snail cam formed with an abrupt drop on the pattern cam shaft, a follower engaging the snail cam and mounted for movement on the main frame at a position for actuation by the abrupt drop on the snail cam after the operations on a shoe have been completed, a pressure venting valve connected for actuation by the cam follower, a pump connected to the valve, a flexible casing between the valve and the shoe clamping means to release a shoe from the clamping means, a time delay inertia member interposed between the cam follower and the valve to retard venting of the pressure through the valve until after a shoe is fully released from the clamping means, a latch engaging the shoe clamping means to prevent reclamping the released shoe, and a button mounted for movement on the shoe clamping means and located in a position to be engaged by a shoe while being applied to the clamping means for releasing the clamping means from the latch.

8. A machine for use in the manufacture of shoes having a main frame, devices in the main frame for operating on a shoe, a pattern cam shaft in the main frame, a jack frame actuated by the pattern cam shaft and mounted for movement on the main frame, and shoe clamping means on the jack frame, in combination with connections actuated by the pattern cam shaft for actuating the shoe clamping means comprising a flexible casing connected at one end to the main frame and at the other end to the shoe clamping means, a cylinder on the jack frame connected to the flexible casing, and a piston in the cylinder connected to the shoe clamping means.

9. A machine for use in the manufacture of shoes having a main frame, devices in the main frame for operating on a shoe, a pattern cam shaft in the main frame, a jack frame actuated by the pattern cam shaft and mounted for movement on the main frame, and shoe clamping means on the jack frame, in combination with connections actuated by the pattern cam shaft for actuating the shoe clamping means comprising a flexible casing connected at one end to the main frame and at the other end to the shoe clamping means, a cylinder on the jack frame connected to the flexible casing, a piston in the cylinder connected to the shoe clamping means, a spring connected to the piston for actuating the clamping means in a direction to clamp a shoe after pressure of the air on the piston is vented.

10. A machine for use in the manufacture of shoes having a main frame, devices in the main frame for operating on a shoe, a pattern cam shaft in the main frame, a jack frame actuated by the pattern cam shaft and mounted for movement on the main frame, and shoe clamping means on the jack frame, in combination with connections actuated by the pattern cam shaft for actuating the shoe clamping means comprising a flexible casing connected at one end to the main frame and at the other end to the shoe clamping means, a cylinder on the jack frame connected to the flexible casing, a valve on the main frame connected to the flexible casing for venting the air in the flexible casing, a piston in the cylinder connected to the shoe clamping means and a spring arranged to be compressed by the piston for moving the shoe clamping means in a direction to clamp a shoe after air pressure in the flexible casing is vented.

11. A machine for use in the manufacture of shoes having a main frame, devices in the main frame for operating on a shoe, a pattern cam shaft in the main frame, a jack frame actuated by the pattern cam shaft and mounted for movement on the main frame, and a shoe supporting cradle having a pivotal mounting on the jack frame comprising a cylinder, a toe rest secured to the cylinder, and a heel clamp slidable on the cylinder toward and from the toe rest, in combination with connections operated by the pattern cam shaft for actuating the heel clamp comprising a piston in the cylinder, a valve on the main frame, and a flexible casing connected at one end to the valve and at the other end to the cylinder.

12. A machine for use in the manufacture of shoes having a main frame, devices in the main frame for operating on a shoe, a pattern cam shaft in the main frame, a jack frame actuated by the pattern cam shaft and mounted for movement on the main frame, and a shoe supporting cradle having a pivotal mounting on the jack frame comprising a cylinder, a toe rest secured to the cylinder, and a heel clamp slidable on the cylinder toward and from the toe rest, in combination with connections operated by the pattern cam shaft for actuating the heel clamp comprising a piston in the cylinder, a valve on the main frame, a flexible casing connected at one end to the valve and at the other end to the cylinder, a spring connected to the piston for actuating it in a direction to clamp a shoe, a pawl mounted on the heel clamp to lock the heel clamp from separation from the toe rest, and means actuated by the piston for unlocking the heel clamp from the pawl to permit separation of the heel clamp from the toe rest.

13. A machine for use in the manufacture of shoes having a main frame, devices in the main frame for operating on a shoe, a pattern cam shaft in the main frame, a jack frame actuated by the pattern cam shaft and mounted for movement on the main frame, and a shoe supporting cradle having a pivotal mounting on the jack frame comprising a cylinder, a toe rest secured to the cylinder, and a heel clamp slidable on the cylinder toward and from the toe rest, in combination with connections operated by the pattern cam shaft for actuating the heel clamp comprising a piston in the cylinder, a valve on the main frame, a flexible casing connected at one end to the valve and at the other end to the cylinder, a spring connected to the piston for actuating it in a direction to clamp a shoe, a pawl mounted on the heel clamp to lock the heel clamp from separation from the toe rest, a rod forming a lost motion connection between the piston and the heel clamp, and connections between the piston and the locking pawl for unlocking the heel clamp when the piston moves through its lost motion relatively to the rod.

14. A machine for use in the manufacture of shoes having a main frame, devices in the main frame for operating on a shoe, a pattern cam shaft in the main frame, a jack frame actuated by the pattern cam shaft and mounted for movement on the main frame, and a shoe supporting cradle having a pivotal mounting on the jack frame comprising a cylinder, a toe rest secured to the cylinder, and a heel clamp slidable on the cylinder toward and from the toe rest, in combination with connections operated by the pattern cam shaft for actuating the heel clamp comprising a piston in the cylinder, a two-position valve on the main frame, a flexible casing connected at one end to the valve and at the other end to the cylinder, a source of compressed air connected to the valve, and means for activating the valve to apply air pressure to the cylinder through the flexible casing in one position of the valve and to vent the air in the cylinder in another position of the valve.

15. A machine for use in the manufacture of shoes having a main frame, devices in the main frame for operating on a shoe, a pattern cam shaft in the main frame, an operating shaft in the main frame for actuating the operating devices, connections between the operating shaft and the pattern cam shaft for rotating the pattern cam shaft intermittently, a jack frame actuated by the pattern cam shaft and mounted on the main frame, shoe clamping means on the jack frame comprising a cylinder and toe rest secured to the cylinder and a heel clamp slidable on the cylinder toward and from the toe rest, in combination with means for actuating the shoe clamping means including a snail cam formed with an abrupt drop on the pattern cam shaft, a spring pressed follower lever engaging the snail cam and mounted for movement on the main frame for actuation by the abrupt drop on the snail cam after the operations on a shoe have been completed, a two-position valve connected for actuation by the cam follower lever, a source of compressed air connected to the valve, a flexible casing between the valve and the shoe clamping means, a time delay inertia member interposed between the cam follower lever and the valve to prevent venting of air in the flexible casing until a shoe is fully released from the clamping means after the abrupt drop on the snail cam passes the cam follower.

16. A machine for use in the manufacture of shoes having a main frame, devices in the main frame for operating on a shoe, a pattern cam shaft in the main frame, a jack frame actuated by the pattern cam shaft and mounted on the main frame, shoe clamping means supported by the jack frame comprising a toe rest, a V-shaped heel clamp slidable toward and from the toe rest, a spring for pressing the heel clamp toward the toe rest, and a latch for retaining the heel clamp in a position separated from the toe rest, in combination with a plunger mounted in the V of the heel clamp in a position to be engaged by the heel end of a shoe, and means operated by the plunger to release the heel clamp from the latch upon lengthwise movement of the shoe against the heel clamp.

17. A machine for use in the manufacture of shoes having a main frame, devices in the main frame for operating on a shoe, a pattern cam shaft in the main frame, a jack frame actuated by the pattern cam shaft and mounted on the main frame, shoe clamping means supported by the jack frame comprising a toe rest, a V-shaped heel clamp slidable toward and from the toe rest, a spring for pressing the heel clamp toward the toe rest, and a latch for retaining the heel clamp in a position separated from the toe rest, in combination with a plunger mounted in the V of the heel clamp in a position to be engaged by the heel end of a shoe, means operated by the plunger to release the heel clamp from the latch upon lengthwise movement of the shoe against the heel clamp, a chute on the toe rest, and a toe end gage on the toe rest provided with a shoe engaging surface inclined with respect to the length of a shoe engaged by the heel clamp in a direction to cause the toe of a small-sized shoe to enter further within the chute than that of a large-sized shoe.

18. A machine for use in the manufacture of shoes having a main frame, devices in the main frame for operating on a shoe, a pattern cam shaft in the main frame, a jack frame actuated by the pattern cam shaft and mounted on the main frame, shoe clamping means supported by the jack frame comprising a toe rest, a V-shaped clamp slidable toward and from the toe rest, a spring for pressing the heel clamp toward the toe rest, and a latch for retaining the heel clamp in a position separated from the toe rest, in combination with a plunger mounted in the V of the heel clamp in a position to be engaged by the heel end of a shoe, means operated by the plunger to release the heel clamp from the latch upon lengthwise movement of the shoe against the heel clamp, a chute on the toe rest, a toe end gage on the toe rest provided with a shoe engaging surface inclined with respect to the length of a shoe engaged by the heel clamp in a direction to cause the toe of a small-sized shoe to enter further within the chute than that of a large-sized shoe, and a plate on the heel clamp against which the bottom of the shoe is pressed to prevent disengagement of the heel end of the shoe from the heel clamp.

19. A machine for use in the manufacture of shoes having a main frame, devices in the main frame for operating on a shoe, a pattern cam shaft in the main frame, a jack frame mounted for movement on the main frame and actuated by the pattern cam shaft, a shoe supporting cradle having a pivotal mounting on the jack frame and comprising a cylinder having a non-circular outer surface, a toe rest secured to the cylinder and a heel clamp slidable on the non-circular surface of the cylinder toward and from the toe rest, in combination with a piston in the cylinder and connections between the piston and the heel clamp for actuating the heel clamp along the cylinder.

20. A machine for use in the manufacture of shoes having a main frame, devices in the main frame for operating on a shoe, a pattern cam shaft in the main frame, a jack frame mounted for movement on the main frame and actuated by the pattern cam shaft, a shoe supporting cradle having a pivotal mounting on the jack frame and comprising a cylinder having a squared outer surface, a toe rest secured to the cylinder, and a heel clamp slidable on the squared surface of the cylinder toward and from the toe rest, in combination with a piston in the cylinder, connections between the piston and the heel clamp, including a piston rod, a crosshead secured to the piston rod and a pair of connecting rods, one at either side of the piston rod between the crosshead and the heel clamp.

21. A machine for use in the manufacture of shoes having a main frame, devices in the main frame for operating on a shoe, a pattern cam shaft in the main frame, a jack frame mounted for movement on the main frame and actuated by the pattern cam shaft, a shoe supporting cradle having a pivotal mounting on the jack frame and comprising a cylinder having a squared outer surface, a series of ratchet teeth formed along a corner at the outer surface of the cylinder, a toe rest secured to the cylinder and a heel clamp slidable on the squared surface of the cylinder toward and from the toe rest, in combination with a piston in the cylinder, connections between the piston and the heel clamp including a hollow rod loosely connected to the piston, a crosshead secured to the piston rod, a pair of connecting rods, one at either side of the piston rod between the crosshead and the heel clamp, a pin running through the piston rod, with one end operatively connected to the piston, a rock lever fulcrumed on the crosshead and connected to the other end of the pin, a link pivotally connected at one end to the rock lever and a pawl on the heel clamp pivotally connected to the other end of the link for movement toward and from the ratchet teeth on the cylinder.

22. A machine for use in the manufacture of shoes having two sets of devices arranged to operate upon and be guided by opposite sides of a shoe, a main frame in which said devices are mounted and connected to move equal amounts simultaneously toward and from a central plane between the operating devices, a jack frame, shoe clamping means supported on the jack frame, a pattern cam shaft in the main frame for actuating the jack frame, a supporting structure for the jack frame comprising a base rotatable about an axis fixed with respect to the main frame, arranged transversely to the length of a shoe in the clamping means and provided with an upwardly extending arm, and a horizontally extending link pivotally connected to the upper end of the base arm for swinging movement about an axis parallel to the pivot for the base, in combination with a pivot shaft connecting the horizontal link and the jack frame with its axis directed parallel to the base pivot and with freedom for substantial relative movement of the jack frame lengthwise of the pivot shaft under the guiding action of the operating device on a shoe.

23. A machine for use in the manufacture of shoes having two sets of devices arranged to operate upon and be guided by opposite sides of a shoe, a main frame in which said devices are mounted and connected to move equal amounts simultaneously toward and from a central plane between the operating devices, a jack frame, shoe clamping means supported on the jack frame, a pattern cam shaft in the main frame for actuating the jack frame, a supporting structure for the jack frame comprising a base rotatable about an axis fixed with respect to the main frame, arranged transversely to the length of a shoe in the clamping means and provided with an upwardly extending arm, and a horizontally extending two-part link pivotally connected to the upper end of the base arm for swinging movement about an axis parallel to the pivot for the base, in combination with a pivot shaft connecting the horizontal link and the jack frame with its axis directed parallel to the base pivot, said pivot shaft being secured to the jack frame with its ends extending between the parts of the horizontal link, and bearing means between parts of said link for the pivot shaft on which the pivot shaft slides axially.

24. A machine for use in the manufacture of shoes having two sets of devices arranged to operate upon and be guided by opposite sides of a shoe, a main frame in which said devices are mounted and connected to move equal amounts simultaneously toward and from a central plane between the operating devices, a jack frame, shoe clamping means supported on the jack frame, a pattern cam shaft in the main frame for actuating the jack frame, a supporting structure for the jack frame comprising a base rotatable about an axis fixed with respect to the main frame, arranged transversely to the length of a shoe in the clamping means and provided with an upwardly extending arm, and a horizontally extending two-part link pivotally connected to the upper end of the base arm for swinging movement about an axis parallel to the pivot for the base, in combination with a pivot shaft connecting the horizontal link and the jack frame with its axis directed parallel to the base pivot, said pivot shaft being secured to the jack frame with its ends extending between the parts of the horizontal link, two sets of spaced friction reducing rolls rotatably mounted on the parts of the horizontal link, and flat surfaced bearing blocks for the shaft, each engaging along its surfaces with one set of rolls to enable relative movement between the jack frame and the link as the operating devices engage opposite sides of a shoe.

25. A machine for use in the manufacture of shoes having two sets of devices arranged to operate upon and be guided by opposite sides of a shoe, a main frame in which said devices are mounted and connected to move equal amounts simultaneously toward and from a central plane between the operating devices, a jack frame, shoe clamping means supported on the jack frame, a pattern cam shaft in the main frame for actuating the jack frame, a supporting structure for the jack frame comprising a base rotatable about an axis fixed with respect to the main frame, arranged transversely to the length of a shoe in the clamping means and provided with an upwardly extending arm, and a horizontally extending two-part link pivotally connected to the upper end of the base arm for swinging movement about an axis parallel to the pivot for the base, in combination with a pivot shaft connecting the horizontal link and the jack frame with its axis directed parallel to the base pivot, said pivot shaft being secured to the jack frame with its ends extending between the parts of the horizontal link, and two sets of spaced friction reducing rolls rotatably mounted on the parts of the horizontal link, and flat surfaced bearing blocks for the shaft, each engaging along its surfaces with one set of rolls to enable relative movement between the jack frame and the link as the operating devices engage opposite sides of a shoe, the upwardly extending arm being constructed integrally with the jack base to prevent transfer of movement imparted to the shoe by the actuating devices to the horizontal link.

26. A machine for use in the manufacture of shoes having a main frame, a shoe supporting jack in the frame including heel and toe engaging members movable toward and from each other to clamp and release a shoe and arranged to admit unobstructed downward passage of a shoe released therefrom under the action of gravity, from a position between them, devices for performing an operation along a shoe supported by the heel and toe clamping members, means including a spring exerting upward pressure on the shoe to force the shoe against the operation performing devices, a toggle connected to the spring and a pattern cam shaft acting when the operations on a shoe are completed for moving the toggle toward straightened position to enable the shoe to drop from the heel and toe clamping members, in combination with an operator actuated latch engaging the toggle for holding it in the position to which it is moved by the pattern cam shaft and for releasing it before starting the machine in operation on a new shoe.

27. A machine for use in the manufacture of shoes having a main frame, devices in the main frame for operating on a shoe, a pattern cam shaft in the main frame, a shoe supporting jack mounted for movement on the main frame, and shoe clamping means on the jack frame comprising a cylinder for actuating the shoe clamping means, in combination with mechanism actuated by the pattern cam shaft for controlling the shoe clamping means including a piston in the cylinder, a valve on the main frame, a flexible casing connected at one end at the valve and at the other end to the cylinder, a grooved cam formed with an abrupt drop on the pattern cam shaft, a spring pressed follower engaging the groove in the cam, a time delay inertia member interposed between the cam follower and the valve, and a shock absorbing connection between the inertia member and the valve to prevent damage to the valve through the action of the abrupt drop on the spring pressed follower.

28. A machine for use in the manufacture of shoes having a main frame, devices in the main frame for operating on a shoe, a pattern cam shaft in the main frame, a shoe supporting jack frame mounted for movement on the main frame, and shoe clamping means on the jack frame comprising a cylinder for actuating the shoe clamping means, in combination with mechanism actuated by the pattern cam shaft for controlling the shoe clamping means including a piston in the cylinder, a valve on the main frame, a flexible casing connected at one end at the valve and at the other end to the cylinder, a grooved cam formed with an abrupt drop on the pattern cam shaft, a spring pressed follower engaging the groove in the cam, a time delay inertia member interposed between the cam follower and the valve, and a shock absorbing connection between the inertia member and the valve to prevent damage to the valve through the action of the abrupt drop on the spring pressed follower, said inertia member being in the form of a fly wheel and a shaft on which the fly wheel is rotatably mounted and the shock absorbing connection being rotatably mounted on the fly wheel acting on the shaft with sufficient frictional resistance to reduce impact and rebound to an insignificant intensity.

29. A machine for use in the manufacture of shoes having a main frame, devices for performing an operation on a shoe in the main frame, a support in the frame upon which said devices are mounted provided with a channel guide and rotatable about an axis substantially perpendicular to the bottom of a shoe being operated upon by said devices, and adjustable mechanism for turning the support about said axis comprising a cam, in combination with connections between the cam and the support including a follower lever having a series of notches along its length, a spring for drawing the follower lever toward the cam, a saddle movable along the lever and connected to said support, and a pin mounted in the saddle for selective engagement with the notches in said lever to increase or decrease the turning movement imparted to the support.

30. A machine for use in the manufacture of shoes having a main frame, devices for performing an operation on a shoe in the main frame, a support in the frame upon which said devices are mounted provided with a channel guide and rotatable about an axis substantially perpendicular to the bottom of a shoe being operated upon by said devices, and adjustable mechanism for turning the support about said axis comprising a cam, in combination with connections between the cam and the support including a follower lever having a series of notches along its length, a spring for drawing the follower lever toward the cam, a saddle movable along the lever and connected to said support, a pin mounted in the saddle for selective engagement with the notches in said lever to increase or decrease the turning movement imparted to the support, and yielding means for preventing disengagement of the pin from the selected notch in the follower lever when the lever is being moved by the cam.

31. A machine for use in the manufacture of shoes having a main frame, a shoe supporting jack mounted for movement on the frame, a pattern cam shaft in the frame, and two sets of devices for performing an operation along opposite sides of a shoe supported by the jack, supports upon which said devices are mounted for individual rotation about axes substantially perpendicular to the shoe bottom, and provided with channel guide abutments, in combination with adjustable mechanism for turning the supports about said axes comprising cams on the pattern cam shaft, followers engaging the cams, levers each having a series of notches along its length on which the followers are mounted, saddles slidingly mounted on the follower levers and connected to the supports, pins carried by the saddles engaging selectively with the notches in the respective levers, and springs connected to the levers for pressing the follower rolls against their cams and for preventing displacement of the pins from the notches.

32. A side lasting machine having a shoe supporting jack, two sets of lasting devices acting on an upper at opposite sides of a shoe supported on the jack, means for actuating said devices to last progressively both sides of the shoe upper as the point of operation is transferred along the shoe, supports upon which said devices are mounted movable toward and from each other, yielding connections tending to separate said lasting devices as the widthwise spacing along the shoe bottom varies, and means operable in response to stopping the machine to draw said supports together, in combination with a latch acting on the yielding connections for preventing separation of the supports until the machine is started on a new shoe, a foot actuated treadle for releasing the connections from the latch to enable the supports to separate, said connections including an arm, one end of which is pivotally connected to others of said connections, the other end of which is formed with a cam surface for increasing or decreasing the yielding separating force of the connections on the lasting devices, and a central portion of which is retained in a position by the latch.

33. A machine for operating upon shoes having a main frame, devices in the main frame for operating on opposite bottom margins of a shoe, a jack frame, a pattern cam shaft in the main frame, a shoe supporting cradle, a rocking mounting for the cradle on the jack frame which is shifted relatively to the cradle transversely of an axis about which the cradle rocks to balance the forces of the operating devices on the shoe about the axis of the rocking mounting, and a rotating cam in the main frame actuated during operation of the operating devices for shifting the position transversely to the shoe of the rocking axis of the cradle mounting, in combination with means for rotating the cam a complete 360° rotation during each operation of the operating devices.

34. A machine for operating upon shoes having a main frame, devices in the main frame for operating on opposite bottom margins of a shoe, a jack frame, a pattern cam shaft in the main frame, a shoe supporting cradle, a rocking mounting for the cradle on the jack frame which is shifted relatively to the cradle transversely of an axis about which the cradle rocks to balance the forces of the operating devices on the shoe about the axis of the rocking mounting, and a pair of cams actuated during operation of the operating devices for changing the transverse position of the cradle rocking axis relatively to the cradle, in combination with means for rotating the cams a complete rotation during each operation of the operating devices, a follower engaging one of the cams and means for shifting the cams relatively to the follower to cause the follower to engage the cams selectively.

35. A machine for operating upon shoes having a main frame, devices in the main frame for operating on opposite bottom margins of a shoe, a jack frame, a pattern cam shaft in the main frame, a shoe supporting cradle, a rocking mounting for the cradle on the jack frame which is shifted relatively to the cradle transversely of an axis about which the cradle rocks to balance the forces of the operating devices on the shoe about the axis of the rocking mounting, and a pair of cams actuated during operation of the operating devices for changing the transverse position of the cradle rocking axis relatively to the cradle, in combination with means for rotating the cams a complete rotation during each operation of the operating devices, a follower engaging one of the cams, means for shifting the cams relatively to the follower to cause the follower to engage the cams selectively, and ratio changing connections comprising slotted levers, a link connecting said levers for sliding movement along the slots thereof, and a carrier having a guideway for the link and a manually actuated bar for shifting the carrier.

36. A machine for use in the manufacture of shoes having devices for performing an operation progressively along a shoe, an operating cam shaft and connections for actuating said devices, a shoe supporting jack, pattern cams and connections for controlling the relative positions of said devices and jack during operations on a shoe, a driving and stopping mechanism for rotating the operating cam shaft and connections driven by the operating shaft for rotating the pattern cams step by step comprising a disk provided with notches spaced about its periphery, a shaft carrying the disk and connected to the pattern cams, a pawl engaging the notches in the disk and a rod between the disk carrying shaft and the driving and stopping mechanism for stopping the operating shaft, in combination with separate mechanisms connected to the pawl, one of which moves the pawl while engaging a notch in the disk to rotate the pattern cam, and the other of which moves the pawl toward and from the disk at the ends of the rotary movement thereof.

37. A machine for use in the manufacture of shoes having devices for performing an operation progressively along a shoe, an operating cam shaft and connections for actuating said devices, a shoe supporting jack, pattern cams and connections for controlling the relative positions of said devices and jack during operations on a a shoe, a driving and stopping mechanism for rotating the operating cam shaft and connections driven by the operating shaft for rotating the pattern cams step by step comprising a disk provided with notches spaced about its periphery, a shaft carrying the disk and connected to the pattern cams, a pawl engaging the notches in the disk and a rod between the disk carrying shaft and the driving and stopping mechanism for stopping the operating shaft, in combination with separate mechanisms connected to the pawl, one of which moves the pawl while engaging a notch in the disk to rotate the pattern cam, and the other of which moves the pawl toward and from the disk at the ends of the rotary movement thereof, and a detent engaging the disk for preventing its rotation while the pawl is disengaged therefrom.

38. A machine for use in the manufacture of shoes having a main frame, two sets of devices in the main frame arranged to act simultaneously at opposite sides of a shoe, an arm mounted for movement on the main frame, a link mounted on the arm to swing about an axis extending transversely to the length of a shoe being operated upon, a jack frame mounted upon the link and shoe clamping means supported on the jack frame, in combination with a shaft forming a pivot connection between the link and the jack frame with freedom for movement along the axis of the pivot connection relatively to the link to accommodate lateral movement of the jack frame transversely of the length of the shoe on the clamping means.

39. A machine for use in the manufacture of shoes having a main frame, two sets of devices in the main frame arranged to act simultaneously at opposite sides of a shoe, an arm mounted for movement on the main frame, a link mounted on the arm to swing about an axis extending transversely to the length of a shoe being operated upon, a jack frame mounted upon the link and shoe clamping means supported on the jack frame, in combination with a shaft forming a pivot connection between the link and the jack frame with freedom for movement along the axis of the pivot connection relatively to the link to accommodate lateral movement of the jack frame transversely of the length of the shoe on the clamping means, and friction reducing rolls mounted on the link for supporting the pivot connection shaft for movement along its axis.

40. A machine for use in the manufacture of shoes having a main frame, devices in the main frame operating simultaneously upon opposite sides of a shoe, a pattern cam shaft in the main frame, an arm mounted for movement on the main frame, a link pivotally connected to the arm, a jack frame mounted on the link, mechanism controlled by the pattern cam shaft for actuating the link to apply an upward force to the jack frame supporting link, a shoe supporting cradle having a pivotal mounting on the jack frame along which the cradle is shiftable relatively to the jack frame transversely to the length of a shoe on the cradle to balance the forces applied to the operating devices by the shoe as the link is moved upwardly and means for shifting the pivotal mounting for the cradle relatively thereto, comprising a Bowden wire and sheath bent through a substantial angle, in combination with means to resist the force of the wire and sheath tending to uncoil them comprising a spring disposed between the link and the jack frame.

References Cited in the file of this patent

UNITED STATES PATENTS

| | | |
|---|---|---|
| 401,727 | Fletcher | Apr. 16, 1889 |
| 731,671 | Dring | June 23, 1903 |
| 2,189,447 | Martin | Feb. 6, 1940 |
| 2,201,866 | Lawson | May 21, 1940 |
| 2,660,739 | Imhof | Dec. 1, 1953 |

FOREIGN PATENTS

| | | |
|---|---|---|
| 908,965 | France | Nov. 12, 1945 |